(12) United States Patent
Kompella

(10) Patent No.: US 8,976,680 B2
(45) Date of Patent: Mar. 10, 2015

(54) OPERATIONS, ADMINISTRATION, AND MANAGEMENT FIELDS FOR PACKET TRANSPORT

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 765 days.

(21) Appl. No.: 12/724,102

(22) Filed: Mar. 15, 2010

(65) Prior Publication Data

US 2011/0222412 A1  Sep. 15, 2011

(51) Int. Cl.
| | |
|---|---|
| *H04L 12/54* | (2013.01) |
| *H04L 12/801* | (2013.01) |
| *H04L 12/701* | (2013.01) |
| *H04L 12/721* | (2013.01) |
| *H04L 12/825* | (2013.01) |

(52) U.S. Cl.
CPC ............... *H04L 47/33* (2013.01); *H04L 45/00* (2013.01); *H04L 45/26* (2013.01); *H04L 45/70* (2013.01); *H04L 47/26* (2013.01)
USPC ........................................................ 370/241.1

(58) Field of Classification Search
CPC .................................................. H04L 43/0811
USPC ........................................... 370/236.2, 241.1
See application file for complete search history.

(56) References Cited

U.S. PATENT DOCUMENTS

| | | | | |
|---|---|---|---|---|
| 7,197,008 | B1* | 3/2007 | Shabtay et al. ................ | 370/218 |
| 7,742,400 | B2* | 6/2010 | Liu .................................. | 370/218 |
| 7,924,725 | B2* | 4/2011 | Mohan et al. ............... | 370/236.2 |
| 7,936,700 | B2* | 5/2011 | Yamazaki et al. ............ | 370/252 |
| 7,961,632 | B2* | 6/2011 | Kondo ....................... | 370/241.1 |
| 8,045,475 | B2* | 10/2011 | Mohan ............................ | 370/241 |
| 8,139,479 | B1* | 3/2012 | Raszuk ........................... | 370/228 |
| 8,605,603 | B2* | 12/2013 | Hill et al. ....................... | 370/248 |
| 2004/0165595 | A1* | 8/2004 | Holmgren et al. ......... | 370/395.3 |
| 2004/0184407 | A1* | 9/2004 | Pok et al. ...................... | 370/236 |
| 2005/0185577 | A1* | 8/2005 | Sakamoto et al. ............ | 370/218 |
| 2006/0092847 | A1* | 5/2006 | Mohan ....................... | 370/241.1 |
| 2006/0133284 | A1* | 6/2006 | Elie-Dit-Cosaque et al. ........................... | 370/241.1 |
| 2007/0081465 | A1* | 4/2007 | Puppa et al. ............... | 370/241.1 |
| 2008/0273467 | A1* | 11/2008 | Zhang et al. ............... | 370/241.1 |
| 2009/0232005 | A1* | 9/2009 | Mohan et al. .............. | 370/241.1 |
| 2010/0002591 | A1* | 1/2010 | Mizutani et al. ........... | 370/241.1 |

OTHER PUBLICATIONS

Ivan Pepelnjak, "MPLS troubleshooting with LSP ping", http://wiki.nil.com/MPLS_troubleshooting_with_LSP_ping, Sep. 13, 2008, 4 pages.
"OAMP", http://en.wikipedia.org/wiki/OAMP, Sep. 25, 2009, 2 pages.
L. Martini et al., "Encapsulation Methods for Transport of Ethernet over MPLS Networks", RFC 4448, The Internet Society, Apr. 2006, 25 pages.
L. Martini et al., "Encapsulation Methods for Transport of Asynchronous Transfer Mode (ATM) over MPLS Networks", RC 4717, The Internet Society, Dec. 2006, 41 pages.

\* cited by examiner

*Primary Examiner* — Ricky Ngo
*Assistant Examiner* — Ben H Liu
(74) *Attorney, Agent, or Firm* — Harrity & Harrity, LLP

(57) ABSTRACT

A network includes an egress node connected to an ingress node via a network path. The egress node is configured to receive, from the ingress node, a group of packets via the network path, where each packet includes an operations, administration, and management (OAM) field appended to the packet, and where the OAM field stores OAM information. The egress node is further configured to read the OAM information from the packets; analyze the OAM information, associated with one or more of the packets, to determine that a network condition exists on the network path; and notify the ingress node that the network condition exists to permit the ingress node to perform a rerouting operation.

28 Claims, 9 Drawing Sheets

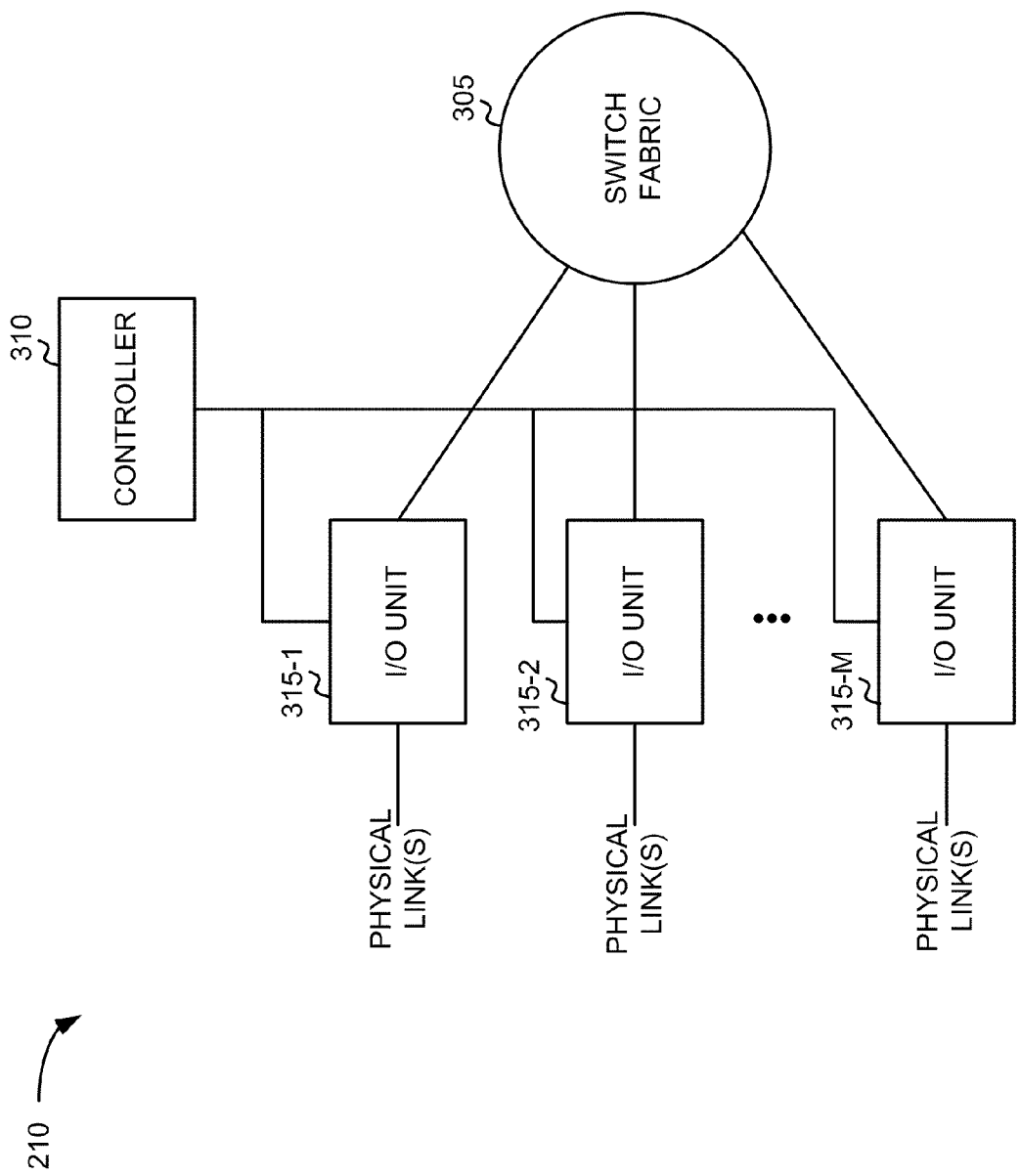

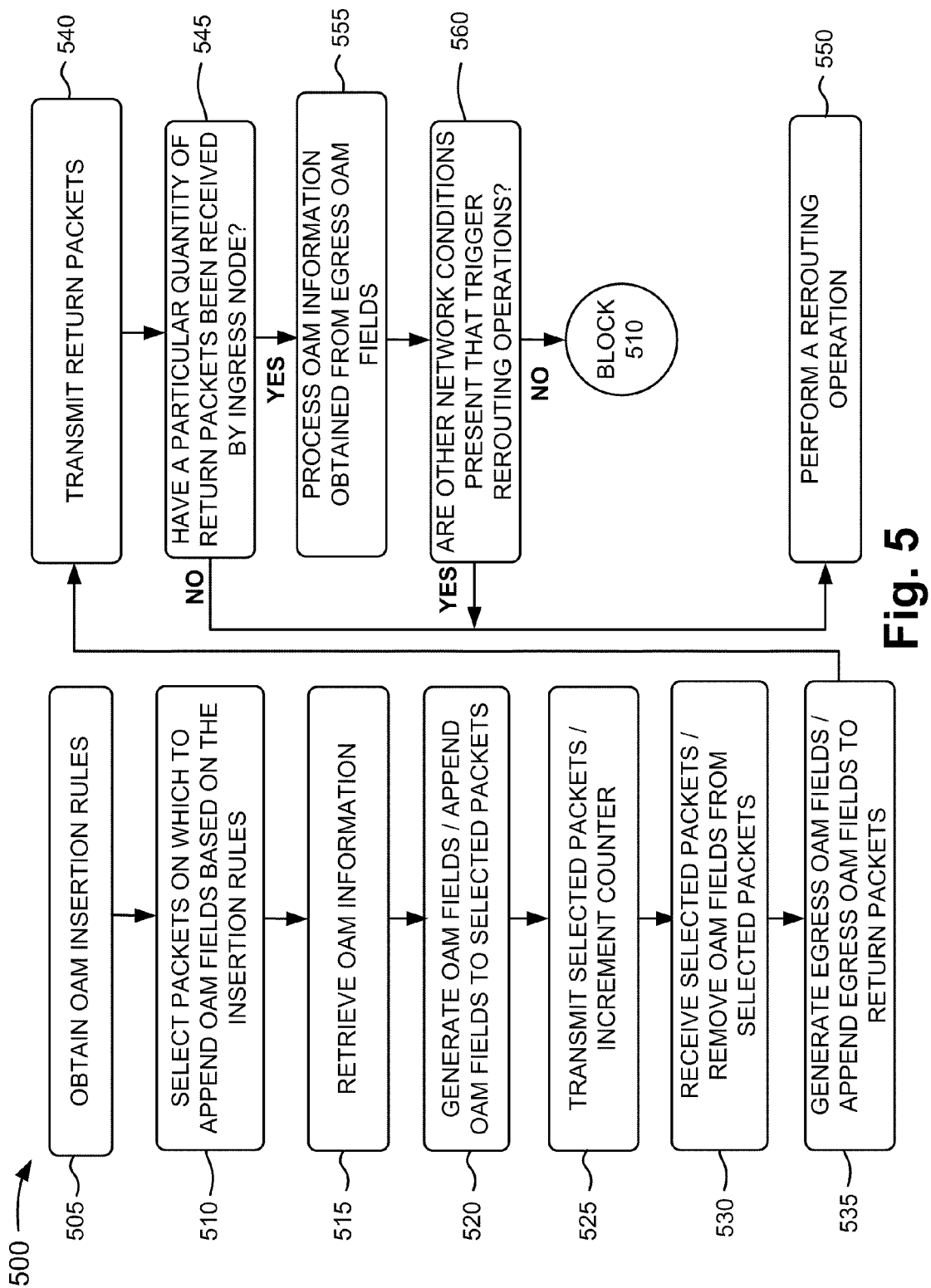

OPERATIONS, ADMINISTRATION, AND MANAGEMENT FIELDS FOR PACKET TRANSPORT

BACKGROUND

In an increasingly networked world, more and more traffic, such as data, voice, and video, is transmitted over public and proprietary networks. When routing traffic through a network, it is desirable to be able to monitor and control connections between nodes in order to dynamically assess network health and to maintain a desired quality of service (QoS) for the network. Circuit-based transport protocols, such as the synchronous optical network (SONET) standard, often include operations, administration, and management (OAM) information appended to or within headers or trailers of payload-carrying frames (e.g., asynchronous transfer mode (ATM) frames) being transported over a network. OAM information is appended to payload-carrying frames for the purpose of detecting certain network conditions, such as congestion, delay, jitter (e.g., mistimed or out-of-sync frames), out-of-order frames, and dropped frames, etc. When certain conditions are detected, OAM notifications are sent that enable network devices to perform rerouting operations and/or network administrators to conduct troubleshooting operations, to implement protection measures, and/or to perform repairs.

In packet-switched networks, OAM information is often inserted into the network as stand alone packets (e.g., sometimes referred to as "probes"), that are separate from payload-carrying packets (e.g., client packets). Thus, stand alone OAM packets transported within a packet-switched network provide similar monitoring and control information as OAM information appended to payload-carrying frames transported within circuit-switched networks. One disadvantage of stand alone OAM packets, however, is that client packets (e.g., unicast or multicast client packets) may experience different network conditions than stand alone OAM packets and, thus, stand alone OAM packets provide only an approximation of the actual network conditions experienced by client packets. Another disadvantage is that stand alone OAM packets add additional bandwidth overhead to the packet-switched network and complicate the packet accounting of the network (e.g., packets or bytes sent/received, etc.).

SUMMARY

According to one aspect, a method may be performed by an egress node connected to an ingress node via a network path. The method may include receiving, from the ingress node, a group of packets via the network path, where each packet may includes an operations, administration, and management (OAM) field appended to the packet, where the OAM field may store OAM information; reading the OAM information from the packets; analyzing the OAM information, associated with one or more of the packets, to determine that a network condition exists on the network path; and notifying the ingress node that the network condition exists to permit the ingress node to perform a rerouting operation.

According to another aspect, a system may include an egress node connected to an ingress node via a network path. The egress node may receive packets from the ingress node via the network path, where the packets may include an OAM field appended to the packets, and where the OAM field may store OAM information. The egress node may read the OAM information from the OAM field, where the OAM information may include sequence information; identify at least one dropped packet when the sequence information indicates that at least one packet has not been received; determine that a network condition exists on the network path when a quantity of the at least one dropped packet exceeds a threshold; and send an OAM notification to the ingress node to identify another network path to the egress node in response to the network condition, where the other network path may be different from the network path.

According to yet another aspect, a system may include an ingress node connected to an egress node via a network path. The ingress node may obtain OAM information, append the OAM information to one or more packets, and output, to the egress node, the one or more packets via the network path. The egress node, connected to the ingress node via the network path, may receive, from the ingress node and via the network path, the one or more packets, read the OAM information from the one or more packets, process the OAM information to create egress OAM information, append the egress OAM information to one or more return packets, and output the one or more return packets with the appended egress OAM information to the ingress node via another network path. The ingress node may receive the one or more return packets from the egress node via the other network path, read the egress OAM information from the one or more return packets, determine whether the egress OAM information indicates that a network condition exists on the network path, and perform a rerouting operation when the network condition exists on the network path.

According to a further aspect, a method may be performed by an ingress node connected to an egress node via a network path. The method may include retrieving OAM insertion rules from a memory; selecting one or more packets based on the OAM insertion rules; appending OAM information to the one or more selected packets; outputting the one or more selected packets to the egress node via the network path; receiving one or more return packets from the egress node, where the one or more return packets may be transmitted by the egress node in response to receiving the one or more selected packets from the ingress node, and where each of the one or more return packets may include egress OAM information; reading the egress OAM information from the one or more return packets; determining whether the egress OAM information indicates that a network condition exists on the network path; and identifying another network path to the egress node when the network condition exists on the network path.

According to a still further aspect, a system may include an ingress node connected to a group of egress nodes, via a group of network paths. The ingress node may retrieve OAM insertion rules from a memory; select one or more packets, of a group of packets, based on the OAM insertion rules; append OAM information to the one or more selected packets to create one or more multicast packets; output each multicast packet of the one or more multicast packets to two or more egress nodes, of the group of egress nodes via two or more network paths of the group of network paths; receive one or more return packets from a particular egress node, of the two or more egress nodes, where the one or more return packets are transmitted by the particular egress node, of the two or more egress nodes, in response to receiving the one or more multicast packets from the ingress node, where each of the one or more return packets includes egress OAM information; read the egress OAM information from the one or more return packets; determine whether the egress OAM information indicates that a network condition exists on a particular network path, of the two or more network paths, that connects the ingress node to the particular egress node, and identify another network path, of the group of network paths, to the particular egress node when the network condition exists on the particular network path.

BRIEF DESCRIPTION OF THE DRAWINGS

FIG. 3 is a diagram of exemplary components of a node of FIG. 2;

FIG. 5 is a flowchart of an exemplary process for performing an operations, administration, and management notification operation;

DETAILED DESCRIPTION

The following detailed description refers to the accompanying drawings. The same reference numbers in different drawings may identify the same or similar elements. Also, the following detailed description does not limit the invention.

An implementation described herein may include systems and/or methods that provide for operations, administration, and management (OAM) notification in a packet-switched network using a technique that can reduce packet count, decrease overhead bandwidth and improve failure detection over packet-switched network paths (e.g., label switched paths (LSPs), Ethernet connections, Internet protocol (IP) connections, etc.). More particularly, OAM information that is typically transported in a separate OAM packet may be appended to, or embedded within, the header field of a payload-carrying packet (e.g., a client packet) of one or more different protocols including, for example, multi-protocol label switching (MPLS), Internet protocol (IP), and/or Ethernet protocol, etc. Edge devices, such as ingress routers and egress routers, core devices, such as core routers, or other network devices, may append OAM information to a client packet being transported over a network path or may remove (e.g., pop) OAM information from a client packet received from a network path. The OAM information may be used to detect network conditions that may trigger network devices to perform automatic rerouting operations and/or to generate OAM notifications to be sent to the network administrator so that troubleshooting and/or maintenance operations may be performed.

The term "packet," as used herein, may refer to a packet, a datagram, or a cell; a fragment of a packet, a fragment of a datagram, a fragment of a cell; or another type, arrangement, or packaging of data. The term "append," as used herein, may refer to attaching information (e.g., an OAM field, etc.) anywhere to a packet. For example appending information to a packet may include attaching the information as a trailer, pre-pending the information as a header, or embedding the information anywhere within the packet.

Figure 1:
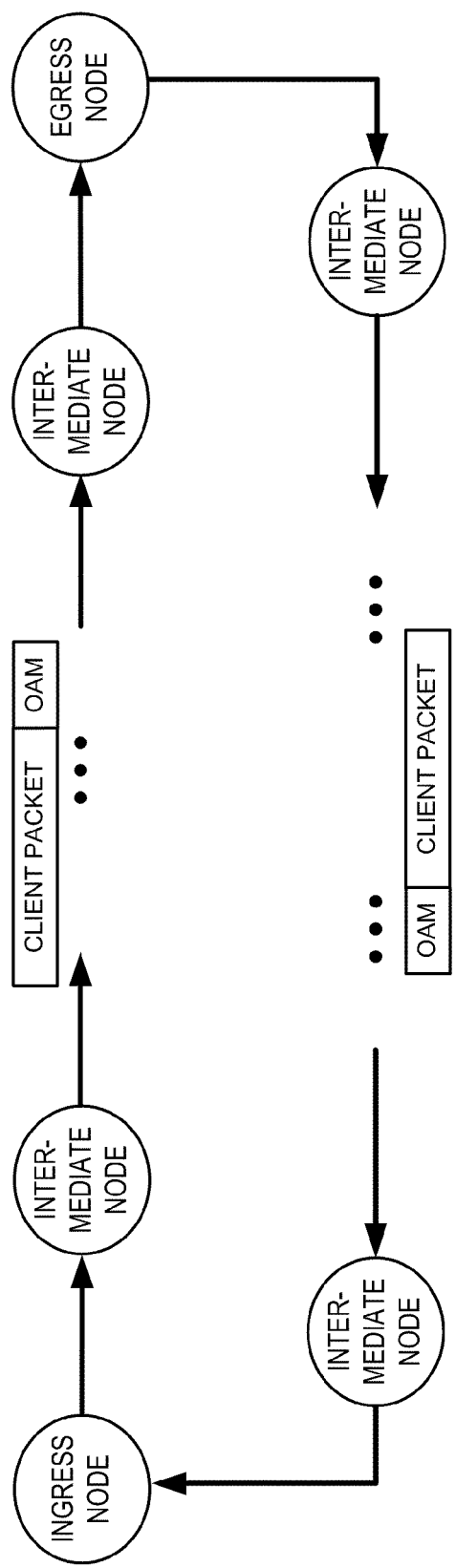
FIG. 1 is a diagram of an overview of an implementation described herein.

FIG. 1 is a diagram of an overview of an implementation described herein. As shown in FIG. 1, assume that a first network path, in a packet-switched network, includes an ingress node, a set of intermediate nodes, and an egress node. The ingress node and the egress node may represent the end points of the first network path.

As shown in FIG. 1, the ingress node may transmit a client packet on the first network path to the egress node. Assume that the client packet includes information that is destined for a client device connected to the network. Assume further that the client packet may include an OAM field, appended to the client packet by the ingress node, within which OAM information is contained that is not destined for the client device. The client packet, with the OAM field, may be transported on the first network path from the ingress node to the egress node via the set of intermediate nodes. The client packet may be associated with other client packets that may be sent with a particular identifier (e.g., a flow identifier (ID)) corresponding to a particular traffic flow and/or service.

The ingress node may be programmed to periodically generate and append an OAM field to a client packet based on OAM insertion rules, stored in the memory of the ingress node, which may specify the manner in which an OAM field is appended to the client packet. The ingress node may transmit the client packet, with the appended OAM field, interleaved with client packets without OAM fields (if any), to the egress node via the set of intermediate nodes of the first network path.

The egress node may receive client packets with or without OAM fields. Furthermore, the egress node may be programmed to detect the presence of the OAM field appended to the client packet, to remove (e.g., pop) the OAM field, and to process the OAM information obtained from the removed OAM field. The egress node may append the processed OAM field to another client packet and may transmit the other client packet, with the processed OAM field, to the ingress node via a second network path. The OAM field, appended to the other client packet by the egress node, may include information about the condition of the first network path between the ingress node and the egress node, such as lost or out-of-order packets, any errors detected, traffic flow quality, whether rerouting may be necessary, etc.

The ingress node on the first network path may receive other client packets with or without processed OAM fields. For example, the ingress node may be programmed to detect the presence of the processed OAM field, appended to the other client packet, and may remove the processed OAM field from the other client packet. Using the OAM information obtained from the processed OAM field, the ingress node may determine whether certain conditions are present on the first network path, such as poor traffic flow quality, dropped packets, jitter, packet delay, mis-routed packets and/or out-of-order packets, etc.

In another example, the egress node may not transmit the processed OAM field to the ingress node. Rather, in a manner similar to that discussed above regarding the ingress node, the egress node may be programmed to detect, remove and/or process the received OAM field and, from the OAM information obtained from the processed OAM field, may determine the condition of the first network path.

As described herein, OAM information that is transported over the first network path may enable nodes, within the first network path, to detect certain network conditions, such as jitter (e.g., when the error associated with packet synchronization with the network clock exceeds a threshold set by the network), packet delay (e.g., when a packet takes too long to transit a network path), dropped packet (e.g., when a packet sent over a network path is not received by the egress node), out-of-order packet (e.g., when a packet sent to an egress node is received in a different order than the packet was transmitted), flow quality, mis-routed packets, and/or other network conditions.

As one example, an OAM field, generated by the ingress node, may include sequence information that may comprise a sequence number that is unique to a particular OAM field and/or may be associated with a particular service or flow, indicated by a service/flow ID. The sequence number may enable the ingress node, the set of intermediate nodes, and/or the egress node to keep track of the order of client packets, traversing the first network path, associated with the particular service or flow, and/or to send an OAM notification if out-of-order client packets and/or missing client packets are detected.

As another example, an OAM field generated by an ingress node may include timestamp information that may comprise a first timestamp, a second timestamp, and/or additional timestamps. For example, the first timestamp may correspond to the time that the ingress node transmitted the client packet, with the OAM field, to the egress node. The second timestamp may correspond to the time that the egress node received the client packet with the OAM field. Other timestamps may correspond to intermediate node timestamps within the first network path. Timestamp information may enable the ingress node and/or the egress node to monitor the transit time of client packets traversing the first network path and/or to send an OAM notification if the presence of jitter and/or time delay are detected.

As yet another example, OAM fields generated by the ingress node may include information associated with the service or flow to which the client packet belongs (e.g., having a particular flow ID), and/or a particular LSP or link over which the client packet is transmitted to the egress node. The information associated with the service or flow may enable the egress node or a network management system, associated with the first network path, to correlate OAM information and other information, such as delay, jitter, dropped packets, and/or out-of-order packets to the client service and/or the LSP carrying the client packets to determine whether a network condition exists, such as poor flow quality and/or other network conditions.

As still another example, OAM fields generated by the ingress node may include identification of the ingress node and the intended egress node. This information may be used to track packets that are mis-routed within the network, to send notifications, and/or for other purposes.

As another example, an OAM field may indicate the presence of further OAM information that may be configured in a nested OAM format. For example, a particular set of OAM information may be related to a client service or flow, and another set of OAM information may relate to an LSP or link over which client packets, associated with the client service or flow, may be transported. A nested OAM format may permit multiple client services or flows, requiring independent and/or separate OAM information, to be transported over the first network path.

An intermediate node, on the first network path, may add OAM information to an existing OAM field and/or may append an additional OAM field to a client packet prior to transmitting the client packet to another intermediate node. The other intermediate node may receive the client packet and may remove the additional OAM field and/or may process the additional information in the existing OAM field. In this example, intermediate nodes may be an ingress node and/or an egress node of a hierarchical path protocol (e.g., a hierarchical LSP, a tunneling protocol, etc.), used on the first network path over which the client packet traverses, in which separate OAM information may be desired.

If, within the first network path, the ingress and/or egress nodes detect conditions, such as those described above (e.g., dropped, out-of-order, mis-routed, and/or delayed client packets and/or the presence of network jitter, etc.), rerouting operations may be performed by the ingress node and/or other network nodes, to determine alternative network paths (e.g., network paths other than the first network path) on which to send client packets to the egress node. Additionally, or alternatively, OAM notifications may be sent that enable network devices and/or the network administrator to determine whether to execute protection measures, perform troubleshooting, and/or conduct maintenance operations as required to maintain or restore network performance and/or network quality of service (QoS).

As described herein, transporting OAM information as part of the client packet may more accurately reflect network conditions for flows and network paths, may reduce overall packet count within the network, and/or may simplify packet accounting regarding the network connections (e.g., network paths) and/or flows or services within the network connections. With respect to simplifying packet accounting within a network, for example, cumulative packet count and/or sent/received bytes transported over a network path may no longer need to be decremented by the number of interleaved OAM packets transported within the network path. Furthermore, reducing the packet types from two packet types (e.g., client packets and separate OAM packets) to a single packet type (e.g., client packets with appended OAM fields, as described above), may reduce bandwidth overhead associated with the network. Additionally, appending OAM information to the client packets may yield more accurate measurements of delay, jitter, packet loss, mis-routed packets, and other characteristics pertaining to client packets and/or network paths than when using separate OAM packets that may experience different network conditions than the actual client packets.

Exemplary System Overview

Figure 2:
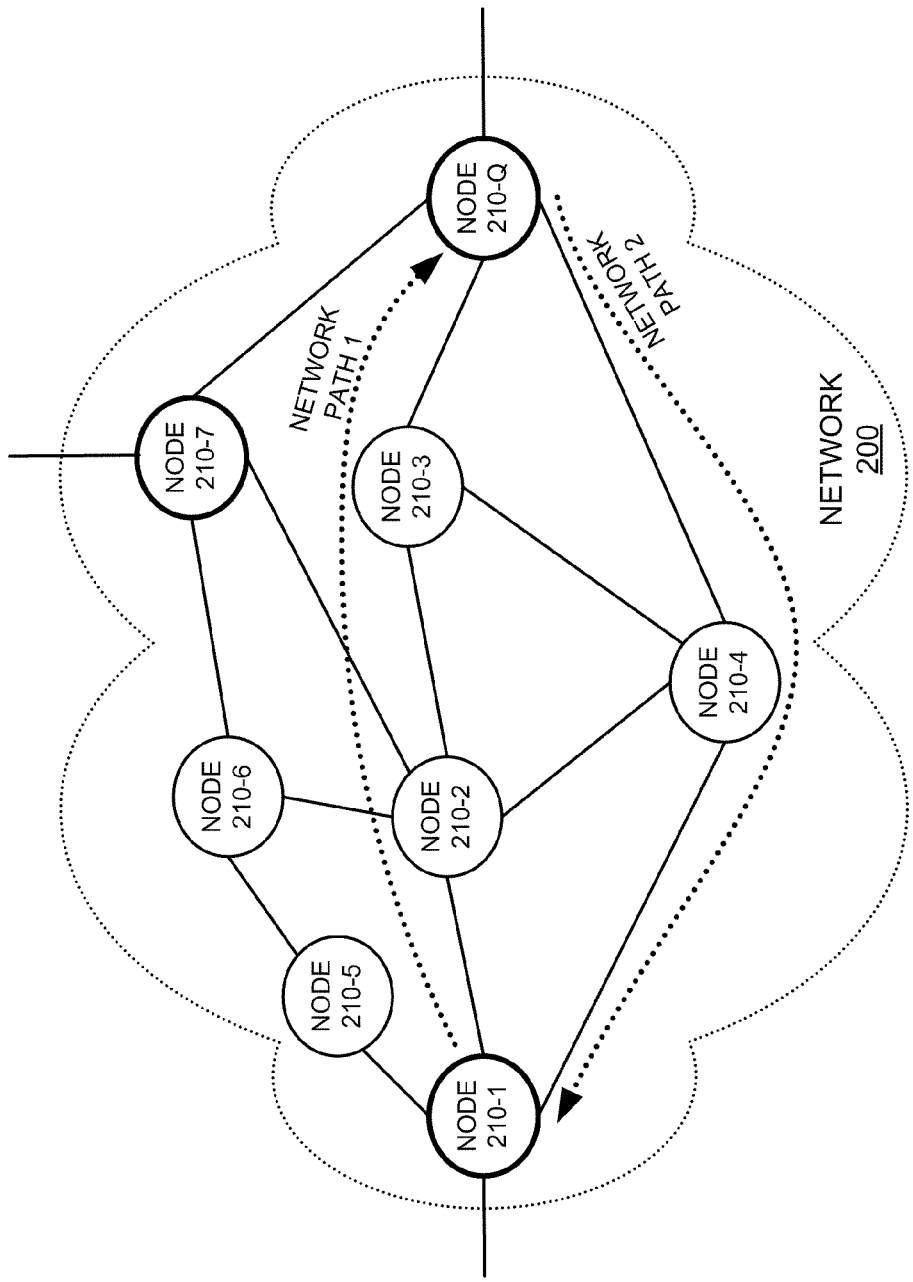
FIG. 2 is a diagram of an exemplary network in which systems and/or methods, described herein, may be implemented.

FIG. 2 is a diagram of an exemplary network 200 in which systems and/or methods, described herein, may be implemented. As shown in FIG. 2, network 200 may include nodes 210-1, 210-2, . . . , 210-Q (where Q≥1) (referred to collectively as "nodes 210," and individually as "node 210"). Nodes 210 may connect via a number of network paths. The network paths may be wired and/or wireless links. Each node 210 may connect to one or more other nodes 210. While FIG. 2 shows a particular number and arrangement of nodes 210, network 200 may include additional, fewer, different, or differently arranged nodes 210 than are illustrated in FIG. 2.

Node 210 may include a network device that transmits data traffic. For example, node 210 may take the form of a routing device, a switching device, a multiplexing device, or a device that performs a combination of routing, switching, and/or multiplexing functions. In one implementation, node 210 may be a digital device. In another implementation, node 210 may be an optical device. In yet another implementation, node 210 may be a combination of a digital device and an optical device.

Edge devices, such as node 210-1, node 210-7, and node 210-Q, may generally function to connect devices, such as client devices or servers, to network 200. Core devices, such as nodes 210-2 through 210-6 may function to transmit data traffic between other nodes within network 200.

In one implementation, edge devices, such as node 210-1, node 210-7, and/or node 210-Q, may add (push) and/or remove (pop) header information from incoming and outgoing packets to begin and terminate each network path. As shown in FIG. 2, the first network path (e.g., labeled as network path 1) may include an ingress node (e.g., node 210-1), a set of intermediate nodes (e.g., node 210-2 and node 210-3), and an egress node (e.g., node 210-Q). Incoming (ingress) packets may be received at node 210-1, which may pre-append (push) header information onto the packet. Additionally, or alternatively, node 210-1 may append OAM fields to a set of packets, that may be one or more multicast packets, which may include, in the OAM fields, information that is used to detect one or more network conditions within one or more network paths over which the one or more multicast packets are transported.

Intermediate nodes 210-2 and 210-3 may switch the packet through network 200, via network path 1, by performing a lookup operation based on the header information and may route the packet based on a result of the lookup operation. Node 210-Q may act as the egress point for network path 1 and may remove (pop) the header information from the packet before forwarding the packet to a client device or server.

The ingress node of network path 1, such as node 210-1, may also append an OAM field to a packet and include, in the OAM field, information that is used to detect one or more network conditions, within network path 1, such as dropped packets, out-of-order packets, delay, and/or jitter. Intermediate nodes, such as nodes 210-2 and/or 210-3, may remove the OAM field; may update the OAM information, obtained from the OAM field, by adding additional information (e.g., timestamp information, flow quality information, error information, lost packet information, etc); and may append the OAM field to the packet. Node 210-Q (e.g., the egress node of network path 1) may receive a packet, may detect the presence of an OAM field appended to the packet, and may remove the OAM field in order to process the OAM information obtained from the OAM field.

Multiple network paths may be set up in network 200. Some of these network paths may share nodes 210. In other words, a particular node 210 may be part of two or more network paths. For example, a second network path (e.g., labeled as network path 2), shown in FIG. 2, may include an ingress node (e.g., node 210-Q), an intermediate node (e.g., node 210-4), and an egress node (e.g., node 210-1). The functions, performed by the particular node 210, may differ for different network paths. For example, the particular node 210 may function as an intermediate node for one network path and as an ingress or egress node for another network path.

Exemplary Node Architecture

FIG. 3 is a diagram of exemplary components of a node 210. As shown in FIG. 3, node 210 may include a switch fabric 305, a controller 310, and input/output (I/O) units 315-1, 315-2, . . . , 315-M (collectively referred to as "I/O units 315," and individually as "I/O unit 315") (where M≥1). In another implementation, node 210 may include fewer, additional, different, or differently arranged components than those illustrated in FIG. 3. Additionally, or alternatively, one or more operations described as being performed by a particular component of node 210 may be performed by one or more other components, in addition to or instead of the particular component.

Switch fabric 305 may include one or more switching planes to facilitate communication among I/O units 315 and/or controller 310. In one implementation, each of the switching planes may include a single or multi-stage switch of crossbar elements. In another implementation, each of the switching planes may include some other form of switching elements. Switch fabric 305 may also, or alternatively, include processors, memories, and/or paths that permit communication among controller 310 and/or I/O units 315.

Controller 310 may include a processor, a microprocessor, or some form of hardware logic (e.g., an application specific integrated circuit (ASIC) or a field programmable gate array (FPGA)). Controller 310 may perform high level management functions for node 210. For example, controller 310 may communicate with other networks and systems connected to node 210 to exchange information regarding network topology. Controller 310 may create routing tables based on the network topology information and forward the routing tables to I/O units 315. I/O units 315 may use the routing tables to perform route lookup operations for incoming data.

Controller 310 may also perform other general control and monitoring functions for node 210. For example, controller 310 may instruct one or more I/O units 315 to remove OAM fields from received client packets. Controller 310 may process timestamp information and/or sequence information obtained from sent and/or received OAM fields to determine the presence of certain network conditions, such as dropped packets, out-of-order packets, delayed packets and/or jitter that may trigger rerouting operations and/or other operations to be performed. Controller 310 may also detect mis-routed packets by examining ingress identification and/or egress identification information within OAM fields. Controller 310 may transmit information obtained from OAM fields to a network management system associated with network 200, or to other nodes in network 200.

Controller 310 may control a clock that may be used as a basis for timestamp information for generating and/or updating OAM fields. Additionally, or alternatively, controller 310 may control a counter that may be used as a basis for sequence information for generating and/or updating OAM fields. Controller 310 may increment the sequence information each time an OAM field is appended to a packet. Controller 310 may compute a "flow quality" metric by processing a number of OAM fields, and may insert the flow quality metric in a particular OAM field or group of OAM fields. Controller 310 may instruct one or more I/O units 315 to append OAM fields to client packets (e.g., MPLS packets, IP packets, Ethernet packets, etc.) for transmission over network 200. The manner in which OAM fields are appended to client packets may be determined by controller 310 in accordance with OAM insertion rules stored in the memory of controller 310.

I/O unit 315 may include a component to receive, transmit, and/or process packets on a network link or network path. For example, I/O unit 315 may include an Ethernet interface, an optical carrier (OC) interface, an asynchronous transfer mode (ATM) interface, or another type of interface. I/O unit 315 may manage a set of one or more input ports via which packets can be received, a set of one or more output ports via which packets can be transmitted, and/or a set of one or more input/output ports via which packets can be received and transmitted. I/O unit 315 may process packets received on a network link and/or packets to be transmitted on a network link. For example, I/O unit 315 may perform operations, such as encapsulation, decapsulation, encryption, decryption, etc. In one implementation, I/O unit 315 may receive instructions from controller 310 and may append (e.g., push), exchange (e.g., swap), or remove (e.g., pop) headers, OAM fields, protocol labels and/or other fields, segments and/or fragments associated with a packet.

Exemplary Packet and OAM Field Formats

Figure 4A:
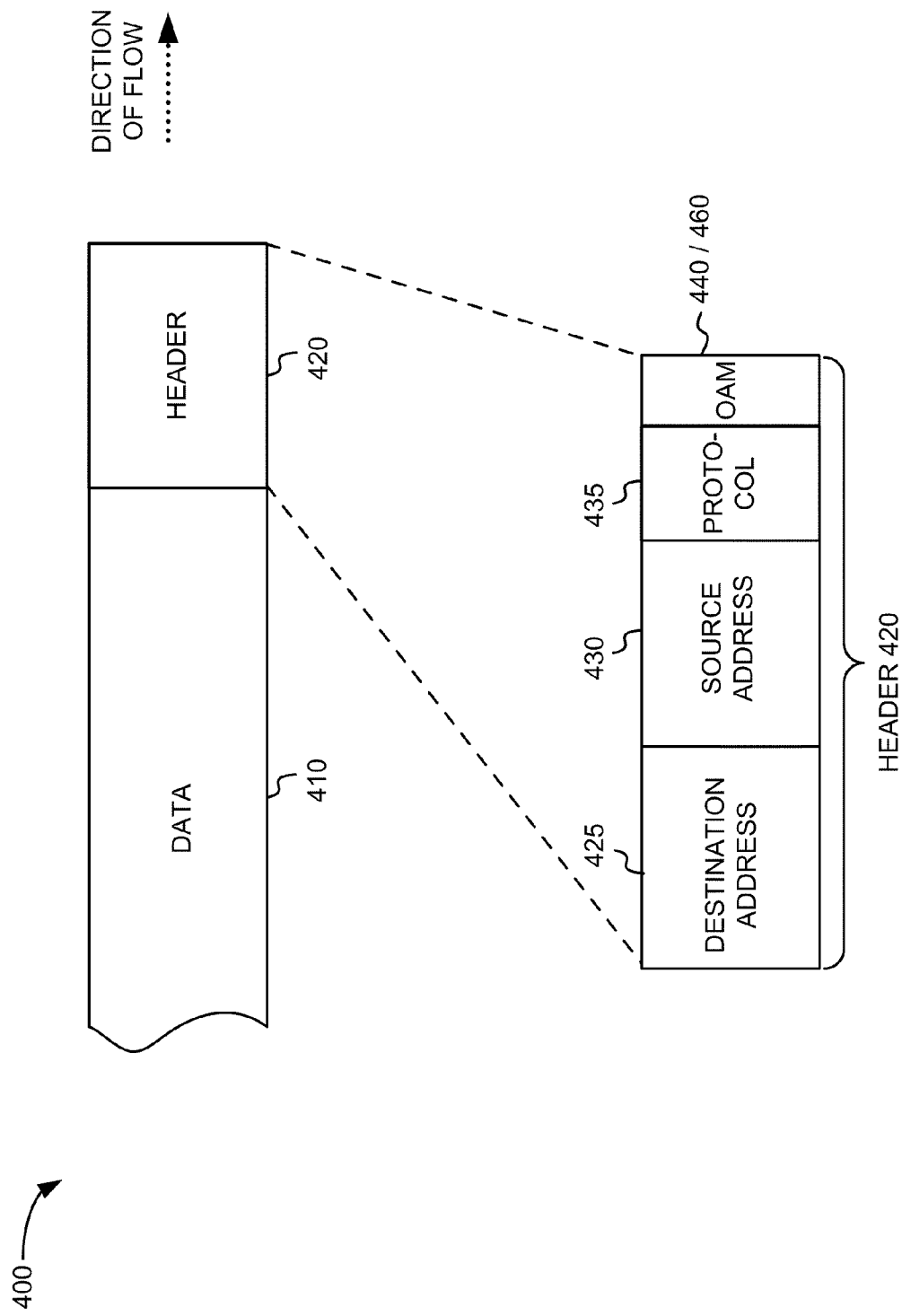
FIG. 4A is a diagram of an exemplary packet.

FIG. 4A is a diagram of an exemplary packet 400. As shown in FIG. 4A, packet 400 may include a data field 410 and a header field 420. In another implementation, packet 400 may include additional, fewer, different, and/or differently arranged fields than are shown in FIG. 4A.

Data field 410 (sometimes referred to as the "payload") may include data and/or information (e.g., data, audio, and/or video, etc.) transported over network 200. Header field 420 may include a destination address field 425, a source address field 430, a packet protocol field 435, and/or OAM information, such as an ingress OAM field 440 and/or an egress OAM field 460. In another implementation, header field 420 may contain additional, fewer, different, and/or differently arranged fields than are shown in FIG. 4A.

Destination address field 425 may store an address corresponding to a particular destination client that is to receive packet 400. Destination address 425 may be distinct from an address associated with a particular ingress node 210 and/or a particular egress node 210 in network 200. For example, the destination client could be a client server, with destination address 425, that is connected to a network that receives packet 400 from one or more nodes 210 within network 200. Source address field 430 may store an address corresponding to a particular source client that sent the packet 400. Source address 430 may be distinct from an address associated with a particular ingress node 210 or a particular egress node 210 in network 200. For example, the source client could be a client server, with source address 430, connected to a network that sends packet 400 to one or more ingress nodes 210 within network 200 for transport to the destination address via an egress node 210.

Protocol field 435 may include additional fields corresponding to one or more of a number of packet protocols (e.g., MPLS, IP, Ethernet, etc.). For example, if packet 400 is an MPLS packet, then protocol field 435 may include an MPLS label that is used, by ingress nodes, intermediate nodes and/or egress nodes, to switch the packet through a LSP. Thus, in this example, protocol field 435 may include a label value field, an experimental field, a bottom of stack field, and/or a time-to-live (TTL) field. The label value field may include the address of the next hop (e.g., the address of the next node within a network path) and/or an instruction for a node to perform some operation on the packet (e.g., to pop the label, to push another label, or to swap the label with another label, etc.). The experimental field may indicate the class of service (e.g., a value of seven may indicate the highest priority and the value of zero may indicate the lowest priority). The bottom of stack field may be used to indicate whether multiple labels are appended to the packet (e.g., a bottom of stack field set to zero may indicate that additional labels follow the particular label; a bottom of stack field set to one may indicate that the particular label is the last label appended to the packet). The TTL field may provide a particular quantity of hops that a packet may make prior to being discarded (e.g., the TTL field may be decremented by one by each node the packet encounters within the network path (e.g., LSP) until the TTL reaches zero in which case the packet may be discarded).

In another example, an IP packet may include, within protocol field 435, a version field, a traffic class field, a flow label field, a payload length field, a next header field, and/or a hop limit field. The version field may include the IP version (e.g., IP version 6). The traffic class field may include the priority of the packet. The flow label field may include a particular quality of service for the packet. The payload length field may include the size of the payload (e.g., the quantity of bytes). The next header field may include the next protocol appended to the IPv6 header, such as a protocol header. The hop limit field may include the number of hops the IPv6 packet may make within a network prior to being discarded (e.g., when the hop limit reaches zero).

In yet other examples, protocol field 435 may contain information corresponding to pseudo-wire (PW) labels, a virtual private network protocol, a tunneling protocol, and/or other packet protocols, etc. OAM field 440 may include OAM information that may enable network devices to monitor and control network paths to enable automatic rerouting operations to be performed when particular network conditions are detected, such as dropped packets, jitter, delayed packets, and/or out-of-order packets.

Figure 4B:
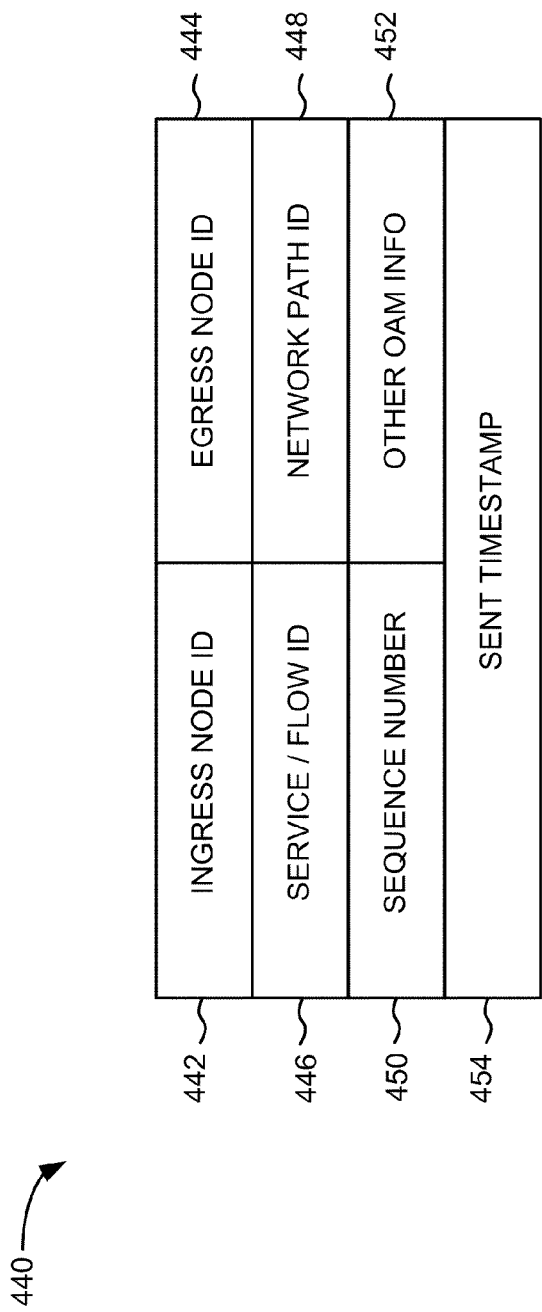
FIG. 4B is a diagram of exemplary ingress operations, administration, and management information that may be stored in the packet of FIG. 4A.

FIG. 4B is a diagram of exemplary ingress OAM information that may be stored in packet 400 of FIG. 4A. For example, as shown in FIG. 4B, ingress OAM field 440 may include ingress node ID field 442, egress node ID field 444, service/flow ID field 446, network path ID field 448, sequence number field 450, other OAM information field 452, and/or sent timestamp field 454

Ingress node ID field 442 may store a network address corresponding to an ingress node that transmits a packet to an egress node via a network path. For example, ingress node ID field 442 may store the network address corresponding to ingress node (e.g., node 210-1) on the first network path of FIG. 2. Egress node ID field 444 may store a network address corresponding to an egress node that receives a packet from an ingress node via a particular network path. For example, egress node ID field 444 may store the network address associated with node 210-Q on the first network path (e.g., network path 1) of FIG. 2.

Service/flow ID field 446 may contain identification information associated with a particular client service or traffic flow, such as a packet or group of packets requiring a particular QoS, priority, security, etc. For example, service/flow ID field 446 may include an identifier for a packet or group of packets, corresponding to a particular packet, with a desired QoS as determined by an ingress node. Network path ID field 448 may include information corresponding to a particular network path, such as an LSP, over which a packet may be transmitted by an ingress node to a particular egress node.

Sequence number field 450 could be derived from a counter controlled by the ingress node (e.g., controller 340 of FIG. 3). For example, the ingress node may cause the counter to be incremented (e.g., by one or some other value) each time ingress OAM field 440 is appended to a packet and transmitted to an egress node over a network path. Other OAM information field 452 may include an indicator that other OAM information is included, such as nested and/or stacked OAM information. For example, OAM information may be included for a group of packets associated with a particular client service or traffic flow (e.g., associated with service/flow ID field 446); other OAM information may be included regarding a network path or a particular LSP over which the particular client service or flow is carried; and/or other OAM information may be included for a hierarchical LSP over which another LSP is carried and over which the particular client service of traffic flow is carried. Sent timestamp field 454 may include timestamp information, derived from a clock associated with the ingress node or the network, inserted into ingress OAM field 440 by the ingress node. Sent timestamp field 454 may correspond to the time ingress OAM field 440 was appended to a packet or transmitted to the egress node via a network path.

In another example, ingress OAM field 440 may contain additional timestamp fields corresponding to the time that intermediate nodes on a particular network path received, processed or transmitted the particular packet containing ingress OAM field 440. In this example, intermediate nodes (e.g., nodes 210-2 and/or 210-3 of network path 1 of FIG. 2) may insert timestamp information into additional fields (not shown in FIG. 4B) of ingress OAM field 440 that may enable nodes to monitor and control network paths to enable automatic rerouting operations to be performed when particular network conditions are detected.

Figure 4C:
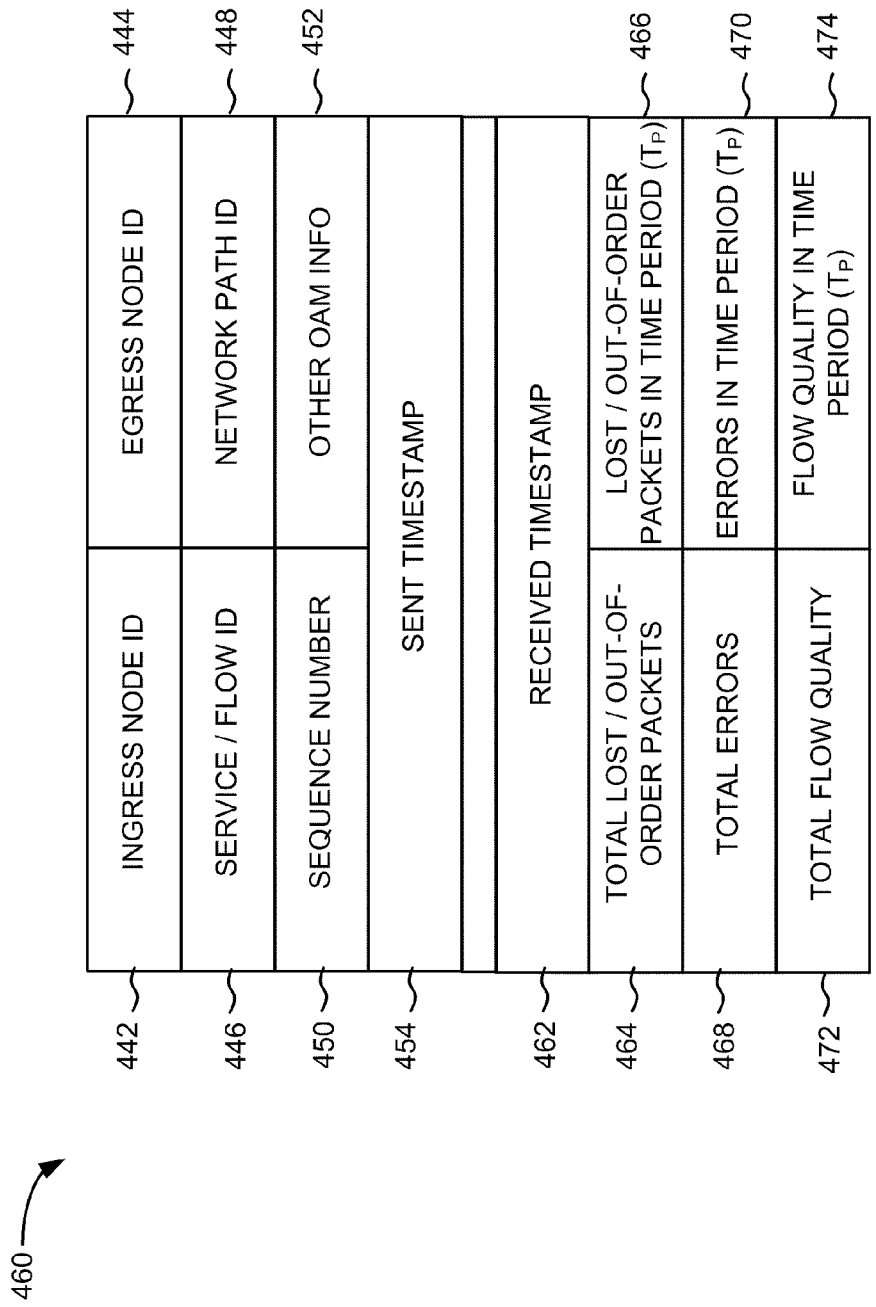
FIG. 4C is a diagram of exemplary egress operations, administration, and management information that may be stored in the packet of FIG. 4A

FIG. 4C is a diagram of exemplary egress OAM information that may be stored in packet 400 of FIG. 4A. As illustrated in FIG. 4C, egress OAM field 460 may include fields 442 through 454, as described above, with respect to ingress OAM field 440 of FIG. 4B. Additionally, or alternatively, updated OAM information and/or additional OAM information may be inserted, by an egress node, into ingress OAM field 440 to create egress OAM field 460, which may include a received timestamp field 462, a total lost/out-of-order packets field 464 (hereinafter referred to as "total lost packet field 464"), a lost/out-of-order packets in time period ($T_P$) field 466 (hereinafter referred to as "lost packet field 466"), a total errors field 468, a total errors in time period (TP) field 470 (hereinafter referred to as "error field 470"), a total flow quality field 472, and/or a flow quality in time period (TP) field 474 (hereinafter referred to as "flow quality field 474").

Received timestamp field 462 may include timestamp information, derived from a clock associated with the egress node or the network. In one implementation, the clock associated with the egress node and/or network may be synchronized with the clock associated with ingress node. The timestamp information, in received timestamp field 462, may correspond to the time a packet was received by the egress node, ingress OAM field 440 was detected, or OAM field 440 was removed by the egress node.

Total lost packets field 464 may include information associated with a cumulative quantity of packets that are dropped and/or determined to be out of order (e.g., based on the sequence number 450 of FIG. 4B), by an egress node, over a particular number of time periods that may be specified by a network administrator. Lost packets field 466 may include the quantity of packets that are dropped and/or are determined to be out of order by an egress node within a particular time period (e.g., $T_P$) that may be specified by the network administrator (e.g., 10 seconds, 1 minute, 5 minutes, etc.). Total errors field 468 may include information associated with a cumulative quantity of mis-routed packets and/or other errors detected by an egress node (e.g., delayed packets, etc.) over a particular number of time periods that may be specified by the network administrator. Errors field 470 may include information associated with the quantity of mis-routed packets and/or other errors detected by an egress node within a particular time period (e.g., $T_P$, which may be the same or different than the particular time period for lost packets field 466), as specified by the network administrator.

Total flow quality field 472 may include flow quality information associated with a QoS (or some other measure of quality) of a particular client service or traffic flow (e.g., associated with flow/service ID field 446) and/or a network path (e.g., associated with network path ID field 448) over a particular quantity of time periods (e.g., $T_P$ or some other period). Flow quality field 474 may include information associated with a QoS (or some other measure of quality) of a particular client service or traffic flow (e.g., service/flow ID field 446) and/or a network path (e.g., network path ID field 448) within a particular time period (e.g., $T_P$ or some other time period). For example, an egress node and/or an ingress node may compute a QoS associated with a particular client service or traffic flow (e.g., as indicated by service/flow ID field 446). The QoS may be computed from the lost packet information (e.g., obtained from total lost packets field 464 and/or lost packet field 466) and/or error information (e.g., obtained from total errors field 468 and/or errors field 470) associated with service/flow ID field 446.

In another example, an egress node and/or an ingress node may compute a QoS associated with a particular network path and/or LSP (e.g., as indicated by network path ID field 448). The QoS may be computed from the lost packet information and/or error information associated with the particular network path and/or LSP. The egress node may store the QoS information in total flow quality field 472 for a particular number of time periods and/or flow quality field 474 (e.g., for a time period $T_P$).

The egress node may append egress OAM field 460 to a return packet and may transmit the return packet to a particular ingress node (e.g., according to ingress ID field 442) to indicate network conditions on a network path between the ingress node and the egress node. Although FIGS. 4B and 4C illustrate ingress OAM field 440 and egress OAM field 460 as including a number of particular fields, in another implementation, ingress OAM field 440 and/or egress OAM field 460 may contain fewer fields, different fields, differently arranged fields, or additional fields than depicted in FIGS. 4B and 4C. Information, in the fields of ingress OAM field 440 and/or egress OAM field 460, may be added, processed, and/or removed by an ingress node, an egress node, or an intermediate node.

Exemplary Processes

FIG. 5 is a flowchart of an exemplary process 500 for performing an OAM notification operation. In one implementation, process 500 may be performed by one or more nodes 210 in network 200. In another implementation, one or more blocks, of process 500, may be performed by a device separate from nodes 210, such as a controller device in communication with nodes 210.

Process 500, of FIG. 5, may include obtaining OAM insertion rules (block 505). Assume that an ingress node, such as node 210-1 with a particular ingress node ID, has received a packet for transport to a particular egress node, such as node 210-Q with a particular egress node ID, via a set of intermediate nodes (e.g., nodes 210-2 and 210-3) on a first network path (e.g., network path 1), as illustrated in FIG. 2. Assume further that the packet is associated with a particular client service or traffic flow with a particular service/flow ID. For example, node 210-1 may retrieve, from a memory (e.g., the node 210-1 memory), OAM insertion rules. The OAM insertion rules may govern the manner in which an OAM field may be appended to a packet for transmission, over a network path, to a particular destination egress node. The OAM insertion rules may be specified for a particular network path. Alternatively, the OAM insertion rules may be common for a group of network paths, for an entire network (e.g., network 200), for a particular port (e.g., associated with an I/O unit 315 of FIG. 3), or for a group of ports (e.g., ports that may be associated with one or more I/O units 315 of FIG. 3).

OAM insertion rules may include the append frequency ($F_A$) that specifies the manner in which an OAM field may be appended to a packet (e.g., $F_A \leq 1$). As one example, the append frequency may comprise a ratio of the number packets transmitted to the number of appended OAM fields. Thus, for example, if the OAM insertion rules specify an append frequency of 0.1 (e.g., 10%), then an OAM field may be appended for every ten packets transmitted by node 210-1. In another example, if the OAM insertion rules specify an append frequency of one (e.g., 100%), then an OAM field may be appended for every packet transmitted by node 210-1.

As another example, instead of, or in addition to, an append frequency, the OAM rules may include an append period ($T_A$) that specifies the manner in which OAM fields may be appended to a packet as a function of time. Thus, for example, an append period may indicate that an OAM field may be appended every 1 ms. In another example, append period may indicate that 30 OAM fields may be appended every 10 ms.

Generally, the number of OAM fields in relation to the number of packets on a particular network path at a particular instant in time may be referred to as the instantaneous OAM field density (hereinafter referred to as "OAM field density") for the particular network path. Therefore, an increase in append frequency or a decrease in append period may correspond to an increase in OAM field density.

The append frequency and/or append period may be set by the network administrator to achieve a particular degree of OAM insight into conditions regarding a particular network path, a series of network paths, or for an overall network while minimizing the overhead bandwidth utilized by OAM fields. On the one hand, a high OAM field density (e.g., an OAM density of one where an OAM field may be appended to every packet transmitted by an ingress node) may provide significant failure detection capability. However, the high OAM field density may correspond to a significant bandwidth overhead penalty, which may affect network performance and/or network quality of service. On the other hand, low OAM field density (e.g., an OAM field density of 0.000001 where one OAM field is appended for every one million packets) may consume negligible overhead bandwidth. However, the low OAM field density may provide limited, if any, OAM insight into network conditions, which may also affect network performance and/or quality of service. Thus, the network administrator may attempt to balance the amount of bandwidth overhead utilized by OAM fields with the degree of OAM insight desired for a particular network path.

Packets may be selected on which to append OAM fields based on the insertion rules (block 510) and OAM information may be retrieved (block 515). For example, node 210-1 may select packets on which to append OAM fields, based on the OAM insertion rules retrieved from memory (e.g., in accordance with the specified append period and/or the specified append frequency). In one example, the selected packets may include unicast packets that may be transmitted to an egress node (e.g., node 210-Q) via a particular network path (e.g., network path 1). In another example, the selected packets may include multicast packets that may be transmitted to the egress node (e.g., node 210-Q) via the particular network path and/or other egress nodes, within network 200 and/or networks different from network 200, via the particular network path and/or via other network paths.

Node 210-1 may obtain OAM information as described above with respect to FIG. 4B, such as information for ingress node ID field 442, egress ID field 444, service/flow ID field 446, network path ID field 448, sequence number field 450, sent timestamp field 454, and/or other OAM information field 458. A sequence number, for sequence number field 450, may be obtained from a counter (e.g., a counter associated with node 210-1 as discussed above in FIG. 4B). A timestamp, for sent timestamp field 454, may be based on a clock (e.g., a clock associated node 210-1 and/or the network).

OAM fields may be generated and the OAM fields may be appended to the selected packets (block 520). For example, using the OAM information, node 210-1 may generate OAM fields (e.g., ingress OAM fields 440) and may append the OAM fields to the selected packets. Node 210-1 may append the OAM fields to the selected packets in a number of ways. For example, node 210-1 may pre-pend the OAM fields to the beginning of (e.g., outside of) the selected packet protocol headers (e.g., MPLS headers). In another example, node 210-1 may append the OAM fields to the end of (e.g., inside of) the selected packet protocol headers. In yet another example, node 210-1 may embed the OAM fields in a different location within the selected packet headers.

The selected packets may be transmitted and a counter may be incremented (block 525). For example, node 210-1 may transmit the selected packets, with the appended OAM fields (e.g., ingress OAM fields 440), to node 210-Q, via intermediate nodes 210-2 and 210-3 on the network path. Intermediate node 210-2 may receive the selected packets, may detect the presence of the appended OAM fields appended to the selected packets, and may remove or update the OAM fields from the selected packets. In one implementation, node 210-2 may update the timestamp in the OAM information obtained from the OAM fields by inserting a timestamp corresponding to the time (e.g., based on a node 210-2 clock or network clock) that each selected packet was received from node 210-1, that each OAM field was processed (e.g., removed, updated, and/or appended, etc.), or that each selected packet was transmitted to node 210-3. In a manner similar to that described for node 210-2, node 210-3 may update the timestamp information in the OAM field and may send the selected packets with the OAM fields to the egress node (e.g., node 210-Q).

In another example, the selected packets may be multicast packets and node 210-1 may transmit the multicast packets, with the appended OAM fields (e.g., ingress OAM fields 440), to node 210-Q, via the network path and/or to other egress nodes 210 via other network paths.

The selected packets may be received and the OAM fields may be removed from the selected packets (block 530). For example, the egress node (e.g., node 210-Q) may receive the selected packets from node 210-1, via the network path (e.g., network path 1 of FIG. 2), and may detect the presence of OAM fields (e.g., ingress OAM fields 440) appended to the selected packets. Node 210-Q may remove the OAM fields from the selected packets to examine the OAM information within the OAM fields.

In another example, the selected packets may be multicast packets and node 210-Q may receive the multicast packets via the network path and/or other egress nodes 210 may receive the multicast packets via the other network paths. Node 210-Q and/or the other egress nodes 210 may detect the presence of OAM fields (e.g., ingress OAM fields 440) appended to the multicast packets and may remove the OAM fields from the multicast packets to examine the OAM information within the OAM fields.

Egress OAM fields may be generated and the egress OAM fields may be appended to return packets (block 535). For example, node 210-Q may record the time that each selected packet is received (e.g., a received timestamp) by node 210-Q. Node 210-Q may store the received timestamp into received timestamp field 462 of egress OAM fields 460 (FIG. 4C), corresponding to the selected packets received by node 210-Q. The received timestamp may correspond to the node 210-Q clock and/or the network clock, which may be synchronized with the clock associated with node 210-1.

Node 210-Q may determine flow quality information for a particular client service or traffic flow using OAM information corresponding to the particular client service or traffic flow (e.g., as indicated by service/flow ID field 446 of FIG. 4B). For example, in a manner similar to that described above with respect to FIG. 4C, node 210-Q may compute flow quality information (e.g., QoS) associated with the particular client service or traffic flow (e.g., as indicated by service/flow ID field 446). Node 210-Q may detect, over a period $T_P$, missing sequence numbers (e.g., dropped packets) associated with a particular client service or traffic flow (e.g., as indicated by service/flow ID 446 of FIG. 4B) and may store the quantity of missing sequence numbers in lost packets field 466 (FIG. 4C) of egress node. Additionally, or alternatively, node 210-Q may receive mis-routed packets, over a period $T_P$ or some other period, in which egress node address information (e.g., as indicated in egress node ID field 444 of FIG. 4B) associated with the received packets does not match the egress node address information associated with node 210-Q. Node 210-Q may insert information corresponding to the quantity of mis-routed packets in error field 470 associated with egress OAM field 460 of FIG. 4C.

Node 210-Q may compute flow quality information (e.g., QoS) for the particular time period (e.g., $T_P$), associated with the particular client service or traffic flow, based on the lost packet information obtained from lost packet field 466 and/or the error information obtained from error field 470. In another example, node 210-Q may compute flow quality information over a particular number of time periods (e.g., $T_P$) based on lost packet information obtained over the particular number of time periods and/or the error information obtained over the particular number of time periods. Node 210-Q may store the QoS information for the particular time period in flow quality field 474 (FIG. 4C) and may store QoS information over a particular number of time periods in total flow quality field 472 (FIG. 4C).

Node 210-Q and may insert the updated and/or additional OAM information (e.g., received timestamp, lost packet information, error information and/or flow quality information, into egress OAM fields 460. Node 210-Q may append egress OAM fields 460 to return packets for transport over network 200.

The return packets may be transmitted (block 540). For example, node 210-Q may determine to which ingress node egress OAM fields 460 are to be sent from the ingress node address information (e.g., as indicated by ingress node ID field 442 of FIG. 4B), obtained from the OAM field removed from the selected packets (e.g., ingress OAM field 440). From the ingress node information, node 210-Q may determine that the return packets, with the appended egress OAM fields 460, may be sent to node 210-1. Node 210-Q may transmit the return packets, with egress OAM fields 460, to the ingress node of the first network path (e.g., node 210-1) via intermediate node 210-4 on the second network path (e.g., network path 2 of FIG. 2). The second network path might be completely distinct from the first network path, or could have one or more nodes in common with the first network path, or could be the same path as the first network path.

In another implementation, the egress OAM fields 460 may be transmitted back to the ingress node in another way. For example, egress OAM fields 460 may be transmitted to ingress node 210-1 by a different network (e.g., a non-packet-switched network).

In yet another implementation, instead of determining from which ingress node a particular OAM field was received, node 210-Q may be pre-programmed (e.g., by a network administrator) to automatically send egress OAM fields 460 back to a particular ingress node of a particular network path, such as a particular LSP associated with a MPLS network.

If a particular quantity of return packets have not been received (block 545-NO), then a rerouting operation may be performed (block 550). For example, node 210-1 may not receive any return packets from node 210-Q, and may perform a rerouting operation. In another example, node 210-1 may receive one or more return packets and may detect the presence of egress OAM fields 460 appended to the return packets. Node 210-1 may remove the egress OAM fields 460 from the return packets and may determine, from the OAM information obtained from the removed egress OAM fields 460, that one or more selected packets are missing, mis-routed, or have otherwise been dropped. For example, node 210-1 may determine that one or more selected packets are missing by detecting the absence of one or more sequence numbers from egress OAM fields 460 removed from the return packets. In another example, node 210-1 may determine that selected packets are missing, or otherwise delayed, when time gaps between received timestamps exceeds a particular threshold that is set by the network administrator. More particularly, node 210-1 may determine that selected packets are missing when node 210-1 detects time gaps between received timestamps that exceed the append period ($T_A$), as discussed above (at block 510), by a particular threshold that is set by the network administrator.

In yet another example, node 210-1 may obtain lost packet information from the removed egress OAM fields 460 and may determine that packets are being dropped. In still another example, node 210-1 may obtain error information from the removed egress OAM fields 460 and may determine that packets are being mis-routed. Additionally, or alternatively, node 210-1 may obtain flow quality information from the egress OAM fields 460 and may determine that a quantity packets, associated with a particular client service or traffic flow, may not have been received by the node 210-Q with the desired QoS level.

Node 210-1 may determine that the number of missing selected packets over the first network path (e.g., network path 1 of FIG. 2) exceeds a particular threshold set by the network administrator and may perform an automatic rerouting operation. For example, node 210-1 may dynamically reroute traffic to the egress node (e.g., node 210-Q) based on conditions on the first network path that may be causing selected packets to be dropped. Node 210-1 may obtain network topology and/or routing table information and may perform a shortest path calculation to determine one or more alternative network paths to send traffic to node 210-Q. Furthermore, node 210-1 may send a notification to one or more other nodes 210, within network 200, indicating that conditions on the first network path may not support network traffic and/or that may enable the other nodes 210 to perform rerouting operations.

As another example, a notification may also be sent to the network administrator. The network administrator may receive the notification and may perform troubleshooting and/or maintenance operations to determine the cause of the particular network condition, the location of a possible fault, and/or to affect the appropriate repair to remedy the condition.

If a particular quantity of return packets have been received (block 545-YES), then OAM information, obtained from egress OAM fields, may be processed (block 555). For example, node 210-1 may receive the return packets and may detect the presence of egress OAM fields 460 appended to the return packets. Node 210-1 may remove the egress OAM fields 460 from the return packets and may examine the OAM information obtained from the egress OAM fields 460. In a manner similar to that described above (at block 545-NO), node 210-1 may determine whether one or more selected packets have been dropped (e.g., based on lost packet information, missing sequence numbers and/or gaps between received timestamps, etc.). However, node 210-1 may not initiate rerouting operations and/or send an OAM notification when the quantity of missing selected packets is below a threshold that is set by the network administrator. Node 210-1 may, instead, process OAM information, obtained from egress OAM fields 460 removed from the return packets, to determine if other network conditions are present within the first network path, such as jitter, packet delay mis-routed packets, and/or out-of-order packets.

If other network conditions are present that trigger rerouting operations (block 560-YES), then a rerouting operation may be performed (block 550). For example, node 210-1 may determine whether jitter and/or packet delay conditions are present, in the first network path, by computing the transit times of the selected packets over the first network path. Node 210-1 may use the timestamp information obtained from the egress OAM fields 460 removed from the return packets. More particularly, node 210-1 may calculate the transit times, of the selected packets traversing the first network path, by subtracting the sent timestamp from the received timestamp for each egress OAM fields 460 removed from the return packets. If the transit times, computed for a particular number of selected packets, exceed a threshold set by the network administrator, then node 210-1 may perform an automatic rerouting operation and/or send an OAM notification in a manner similar to that discussed above (at block 550).

As another example, node 210-1 may determine that the selected packets have been received by node 210-Q in a different order from which the selected packets were transmitted by node 210-1. In this example, node 210-1 may compare the sequence numbers obtained from egress OAM fields 460 removed from return packets, and may determine that the sequence numbers are out-of-order (e.g., not sequential). If the quantity of out-of-order selected packets exceeds a particular threshold, as set by the network administrator, then node 210-1 may perform an automatic rerouting operation and/or send a notification in a manner similar to that described above (at block 550).

As yet another example, node 210-1 may determine that mis-routed selected packets have been received by egress node 210-Q. In this example, node 210-1 may obtain error information for time period ($T_P$) (e.g., from error field 470) or a particular number of time periods (e.g., from total error field 468) from egress OAM fields 460. If, from the error information, node 210-1 determines that the quantity of mis-routed packets exceeds a particular threshold, as set by the network administrator, then node 210-1 may perform an automatic rerouting operation and/or send a notification in a manner similar to that described above (at block 550).

As still another example, node 210-1 may determine that selected packets have been received by egress node 210-Q below the desired flow quality or QoS as set by the network administrator. In this example, node 210-1 may obtain flow quality information for a time period ($T_P$) (e.g., from flow quality field 474) or a particular number of time periods (e.g., from total flow quality field 472) from egress OAM fields 460. If, from the flow quality information, node 210-1 determines that the quantity of selected packets with a flow quality that is less than a particular threshold, as set by the network administrator, then node 210-1 may perform an automatic rerouting operation and/or send a notification in a manner similar to that described above (at block 550).

If other network conditions are not present that trigger rerouting operations (block 560-NO), then additional packets may be selected on which OAM fields may be appended based on the insertion rules (block 510). For example, node 210-1 may determine that jitter, packet delay, mis-routed packets, and/or out-of-order packets are not present in the first network path (e.g., network path 1 of FIG. 2). In this example, node 210-1 may determine that transit times for a particular number of selected packets are below a particular threshold, which constitutes a delayed packet condition, as set by the network administrator. Additionally, or alternatively, node 210-1 may determine that even though transit times for one or more selected packets are above the threshold for a delayed packet condition, the particular quantity of delayed selected packets is below a particular threshold as set by the network administrator.

Furthermore, node 210-1 may determine that sequence numbers, obtained from egress OAM fields 460 removed from return packets, are sequential and/or that the quantity of out-of-order sequence numbers is below a particular threshold, which constitutes an out-of-order packet condition, as set by the network administrator. Therefore, node 210-1 may determine that particular network path conditions may not be present on the network path that would otherwise trigger a rerouting operation and/or an OAM notification. Node 210-1 may select other packets on which to append OAM fields based on the insertion rules obtained from the memory of node 210-1.

Figure 6:
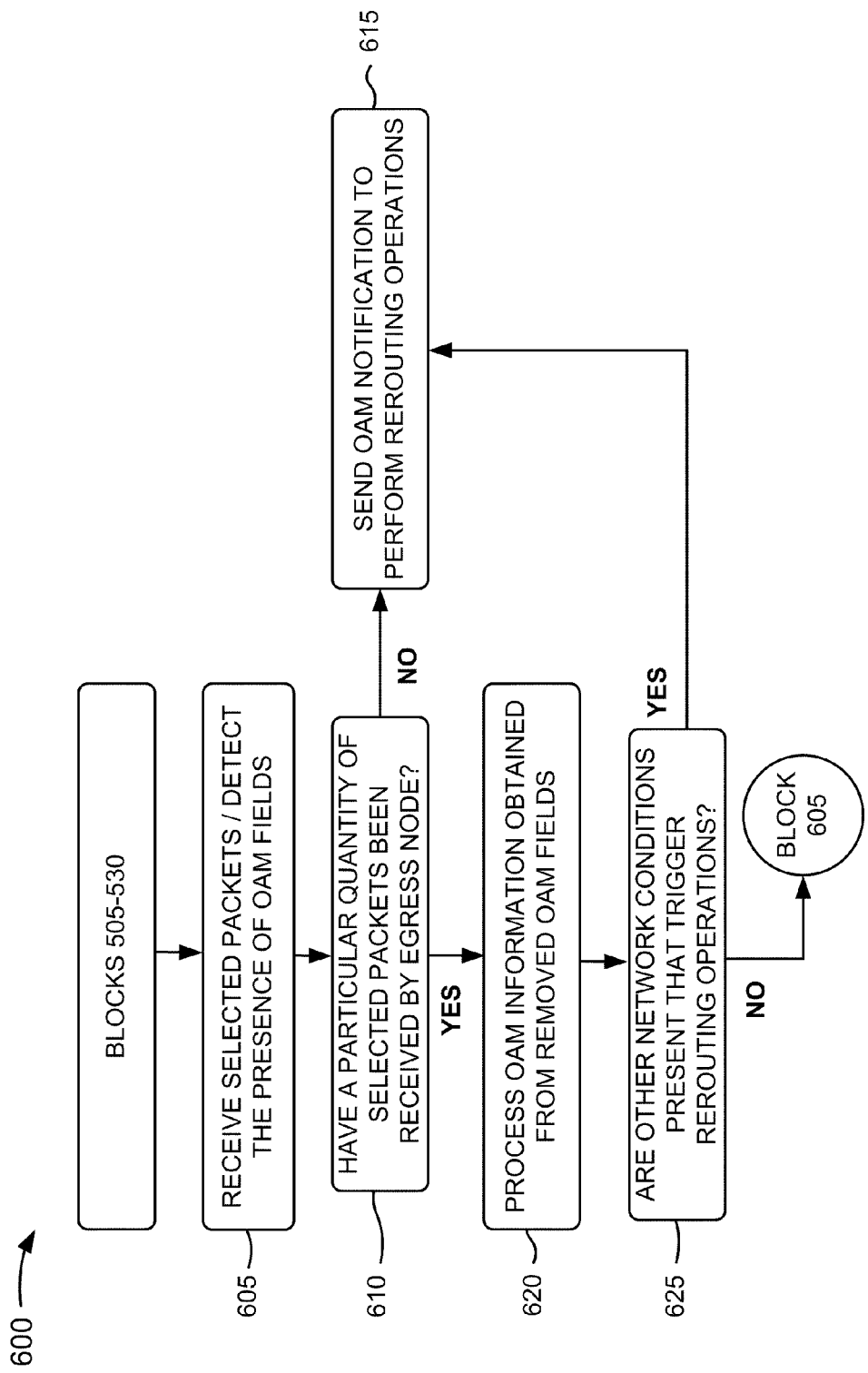
FIG. 6 is a flowchart of another exemplary process for performing an operations, administration, and management notification operation.

FIG. 6 is a flowchart of another exemplary process 600 for performing an OAM notification operation. In one implementation, process 600 may be performed by one or more nodes 210 in network 200. In another implementation, one or more blocks, of process 600, may be performed by a device separate from nodes 210, such as a controller device in communication with nodes 210.

Process 600, of FIG. 6, may include generating OAM fields and appending the OAM fields to selected packets for transmission to an egress node via a network path. For example, in a manner similar to that described above (at blocks 505-530 of FIG. 5), node 210-1 may obtain insertion rules and may select packets on which to append OAM fields. Furthermore, node 210-1 may generate OAM fields, based on retrieved OAM information, may append the OAM fields to the selected packets, and may transmit the selected packets, with appended OAM fields, to node 210-Q via the first network path (e.g., network path 1 of FIG. 2).

Selected packets may be received and the presence of OAM fields may be detected (block 605). For example, egress node (e.g., node 210-Q) may receive selected packets from the ingress node (e.g., node 210-1), via intermediate nodes 210-2 and 210-3, on the first network path (e.g., network path 1 of FIG. 2). Node 210-Q may detect the presence of OAM fields appended to the selected packets (e.g., ingress OAM fields 440 of FIG. 4B).

If a particular quantity of selected packets have not been received (block 610-NO), then an OAM notification may be sent to perform a rerouting operation (block 615). For example, node 210-Q may not receive any selected packets and may send an OAM notification to node 210-1, and/or other nodes 210 within network 200, indicating that conditions on the first network path may not support network traffic. In another example, node 210-Q may receive one or more selected packets and may remove OAM fields from the selected packets. From the OAM information obtained from the OAM fields removed from the selected packets, and in a manner similar to that discussed above (at block 545-NO), node 210-Q may determine that one or more selected packets are missing or have otherwise been dropped (e.g., by detecting the absence of one or more sequence numbers). Additionally, or alternatively, node 210-Q may determine that one or more selected packets are missing or are otherwise delayed by detecting gaps between sent timestamps (e.g., where the gap between sent timestamps exceeds the append period ($T_A$) by a particular threshold that is set by the network administrator).

Node 210-Q may send an OAM notification. For example, node 210-Q may determine that the number of missing selected packets over the first network path exceeds a particular threshold that is set by the network administrator. Node 210-Q may send an OAM notification to node 210-1 (e.g., based on the ingress node ID information obtained from the OAM fields) and/or other nodes 210 indicating that conditions on the first network path may not support network traffic (e.g., due to dropped packets, delay, jitter, mis-routed packets, and/or out-of-order packets, etc.). The OAM notification may enable node 210-1 and/or other nodes 210 to perform automatic rerouting operations in a manner similar to that described above (at block 550 of FIG. 5).

If a particular quantity of selected packets have been received (block 610-YES), then OAM information obtained from removed OAM fields may be processed (block 620). For example, node 210-Q may receive the selected packets and may detect the presence of OAM fields appended to the selected packets. Node 210-Q may remove the OAM fields from the selected packets and may examine the OAM information obtained from the OAM fields (e.g., ingress OAM field 440 of FIG. 4B). In a manner similar to that described above (at block 610-NO), node 210-Q may determine that one or more selected packets have been dropped (e.g., based on missing sequence numbers and/or gaps between received timestamps, etc.). However, node 210-Q may not initiate rerouting operations and/or send an OAM notification when the number of missing selected packets is below a threshold that is set by the network administrator. Node 210-Q may, instead, process OAM information obtained from the OAM fields removed from the selected packets to determine if other network conditions are present within the first network path, such as jitter, delayed packets and/or out-of-order packets.

If other network conditions are present that trigger rerouting operations (block 625-YES), then an OAM notification may be sent to perform a rerouting operation (block 615). For example, node 210-Q may determine whether jitter and/or delayed packet conditions are present by computing the transit times of the selected packets over the first network path. Node 210-Q may compute the transit time for each selected packet by subtracting the sent timestamp, obtained from the OAM field that is removed from each selected packet, from the time each selected packet was received by node 210-Q (e.g., based on a clock associated with node 210-Q). If the transit times computed for a particular number of selected packets exceed a threshold set by the network administrator, then node 210-Q may send an OAM notification to node 210-1 and/or other nodes 210 within network 200 in a manner similar to that discussed above.

As another example, node 210-Q may determine that the selected packets have been received in a different order from which the selected packets were transmitted by node 210-1. In this example, node 210-Q may compare the sequence numbers obtained from OAM fields, that are removed from selected packets, and may determine that the sequence numbers are out-of-order (e.g., not sequential). If the quantity of out-of-order selected packets exceeds a particular threshold set by the network administrator, node 210-Q may send an OAM notification to node 210-1 and/or other nodes 210 within network 200 in a manner similar to that discussed above.

As yet another example, node 210-Q may determine that mis-routed selected packets have been received from node 210-1. In this example, node 210-Q may compare the egress node address information obtained from OAM fields, that are removed from selected packets, and may determine that the egress node information corresponds to a different egress node 210 (e.g., different than node 210-Q). If the quantity of mis-routed selected packets exceeds a particular threshold set by the network administrator, node 210-Q may send an OAM notification to node 210-1 and/or other nodes 210 within network 200 in a manner similar to that discussed above.

If other network conditions are not present that trigger rerouting operations (block 625-NO), then additional selected packets may be received and OAM fields may be removed from selected packets (block 605). For example, node 210-Q may determine that jitter, delay, mis-routed, and/or out-of-order packets are not present in the first network path (e.g., network path 1 of FIG. 2). In this example, node 210-Q may determine that transit times for a particular number of selected packets are below the threshold, which constitutes a delayed packet condition, as set by the network administrator. Additionally, or alternatively, node 210-Q may determine that even though transit times for one or more selected packets are above the threshold for a delayed packet condition, the particular quantity of delayed packets is below a threshold as set by the network administrator.

Furthermore, node 210-Q may determine that sequence numbers, obtained from OAM fields, removed from selected packets, are sequential and/or that the quantity of out-of-order sequence numbers is below a particular threshold that would otherwise constitute an out-of-order packet condition, as set by the network administrator. Therefore, node 210-Q may determine that particular network path conditions, that may trigger an OAM notification, may not be detected within the first network path. Node 210-Q may continue to receive other selected packets from node 210-1.

Exemplary OAM Notification Operation

Figure 7:
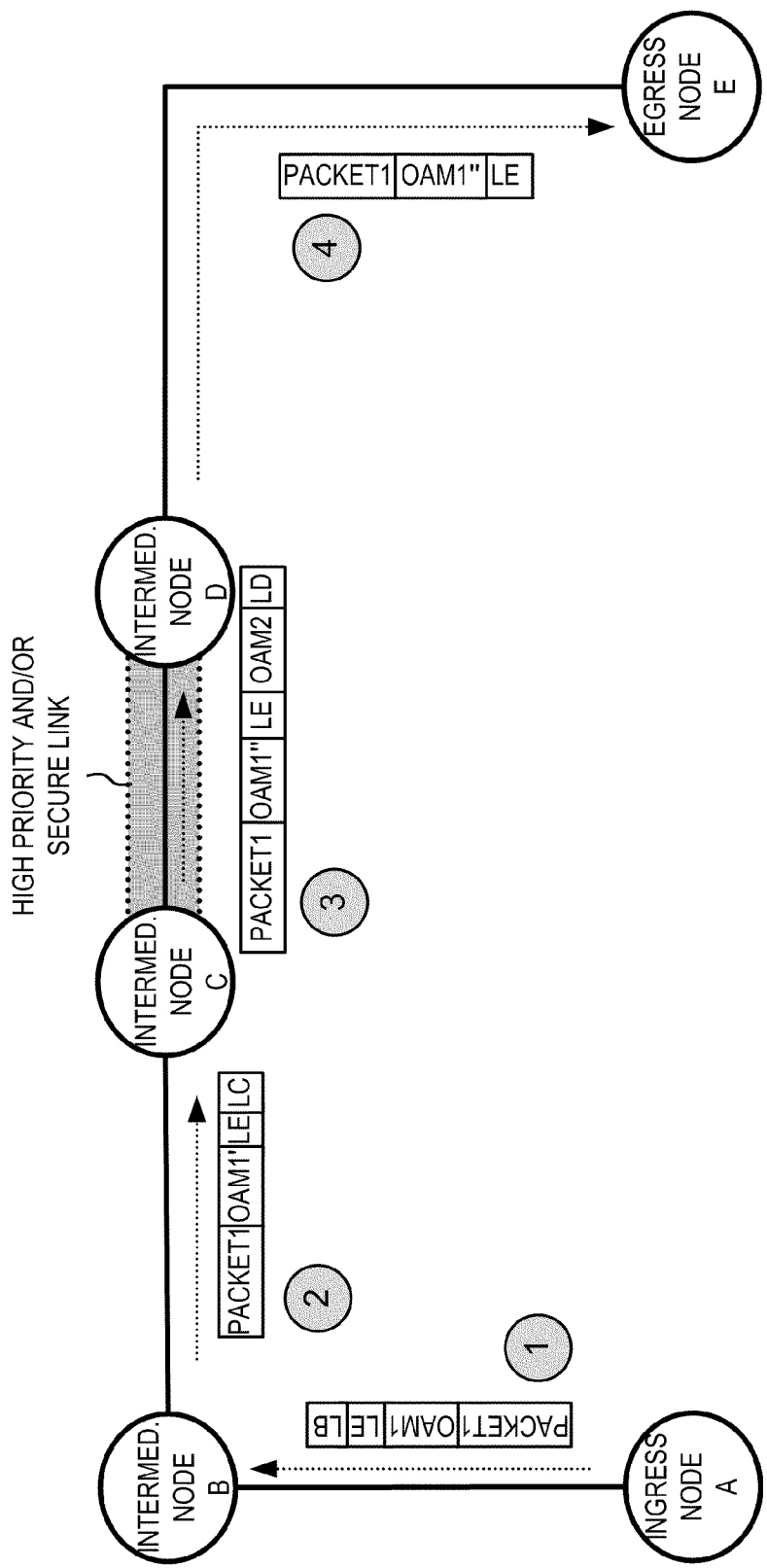
FIG. 7 is a simplified diagram of an exemplary operations, administration, and management notification operation within a network.

FIG. 7 is a simplified diagram of an exemplary OAM notification operation within a network. As shown in FIG. 7, assume an LSP, transporting MPLS packets, has been set up between ingress node A and egress node E. Assume further that the LSP includes intermediate nodes B, C, and D and that the network path between intermediate nodes C and D is a high priority and/or secure link, such as a virtual private network (VPN), a psuedowire (PW), or a private link using a tunneling protocol. Assume yet further that ingress node A, intermediate nodes C and D, and egress node E may be label edge routers (e.g., LERs) capable of generating, pushing and/or popping MPLS labels and that intermediate node B is a label switch router (LSR) capable of swapping MPLS labels, as described herein.

Ingress node A may generate an OAM field. For example, in a manner similar to that discussed above (at blocks 505-510 of FIG. 5), ingress node A may retrieve OAM insertion rules from memory and may determine whether to append an OAM field to a packet destined for egress node E. From the OAM insertion rules, ingress node A may determine that the append frequency and/or append period specifies that an OAM field (e.g., OAM1) should be appended to the packet (e.g., packet 1).

Ingress node A may generate an OAM field and may append the OAM field to the packet for transmission to intermediate node B. For example, in a manner similar to that described above (at blocks 515-525 of FIG. 5), ingress node A may retrieve sequence information (e.g., a sequence number corresponding to a counter associated with ingress node A), ingress node information, egress node information, client service or traffic flow information, network path information (e.g., associated with the LSP), and/or timestamp information (e.g., the sent timestamp corresponding to a network clock) and may generate the OAM field. Ingress node A may append the OAM field to the packet.

Ingress node A may generate MPLS labels corresponding to egress node E, as the LSP terminal destination of the packet (e.g., MPLS label E, "LE"), and corresponding to intermediate node B, as the next hop on the LSP (e.g., MPLS label B, "LB"). As shown in FIG. 7, ingress node A may push the labels (e.g., LE and LB) to the packet resulting in the packet as follows: the payload and/or data portion of the packet (e.g., packet 1), the OAM field (e.g., OAM1), the MPLS destination label (e.g., LE), and the MPLS label corresponding to the next hop, intermediate node B (e.g., LB). Ingress node A may transmit the packet, as shown as (1) in FIG. 7, to intermediate node B.

Intermediate node B may receive the packet and may swap the next hop label (e.g., "LB") with another next hop label corresponding to intermediate node C (e.g., "LC"). Furthermore, intermediate node B may detect the presence of the OAM field (e.g., OAM1), appended to the packet, may remove the OAM field, and may update the timestamp information within the OAM field by inserting a timestamp associated with the time that intermediate node B received, processed, or sent the packet. Intermediate node B may append the updated OAM field to the packet resulting in the packet as follows: the payload and/or data portion of the packet (e.g., packet 1), the updated OAM field (e.g., OAM1'), the MPLS destination label (e.g., LE), and the MPLS label corresponding to the next hop, intermediate node C (e.g., LC). Intermediate node B may transmit the packet, as shown as (2) in FIG. 7, to intermediate node C.

Intermediate node C may represent an intermediate node on the LSP and an ingress node corresponding to the high priority and/or secure link (hereinafter referred to as a "tunnel") between intermediate node C and intermediate node D, as shown in FIG. 7. For example, the tunnel may use an additional and/or different protocol than the protocol used by the LSP. The tunneling protocol may provide a particular service (e.g., a particular security service or QoS) to packets traversing the LSP between intermediate nodes C and D. Moreover, the tunnel may provide an OAM notification operation that is distinct from, and/or in addition to, the OAM notification operation within the LSP.

Intermediate node C may receive the packet and may process the packet. For example, intermediate node C may receive the packet, may remove the next hop label corresponding with intermediate node C (e.g., LC). Furthermore, intermediate node C may detect the presence of the updated OAM field (e.g., OAM1'), may remove the updated OAM field, and may insert a timestamp associated with the time that intermediate node C received, processed, or sent the packet. Intermediate node C may append the updated OAM field (e.g., OAM1") to the packet.

Intermediate node C may generate an OAM field (e.g., with nested OAM information) associated with the tunnel. For example, in a manner similar to that discussed above (at blocks 505-525 of FIG. 5), intermediate node C may retrieve OAM insertion rules associated with the tunnel and may determine that the OAM field associated with the tunnel may be appended to the packet. Intermediate node C may retrieve sequence information (e.g., a sequence number corresponding to a counter associated with ingress node C), tunnel ingress node information, tunnel egress node information, client service or traffic flow information (e.g., associated with the tunnel), network path information (e.g., associated with the tunnel) and/or timestamp information (e.g., sent timestamp associated with a clock of intermediate node C) and may generate the OAM field associated with the tunnel (e.g., "OAM2"). OAM 2 may also include other OAM information that includes an indicator that other OAM information (e.g., OAM information stored in OAM1") is appended to the packet. Intermediate node C may pre-pend OAM2 to MPLS destination label (e.g., LE).

Intermediate node C may append a tunnel destination label to the packet and may transmit the packet. For example, intermediate node C may generate a tunnel destination label corresponding to the tunnel destination node D (e.g., LD) and may append the tunnel destination label to the packet. More particularly, intermediate node C may pre-pend the tunnel destination label (e.g., sometimes referred to as a "digital wrapper") to the packet resulting in the packet as follows: the payload and/or data portion of the packet (e.g., packet 1), the updated OAM field (e.g., OAM1"), the MPLS destination label (e.g., LE), the OAM field associated with the tunnel (e.g., OAM2), and the tunnel destination label (e.g., LD). Intermediate node C may transmit the packet, as shown as (3) in FIG. 7, to intermediate node D.

Intermediate node D may receive the packet and may process the packet. For example, intermediate node D may receive the packet and may remove the tunnel destination label (e.g., LD). Furthermore, intermediate node D may detect the presence of OAM2 and may remove OAM2 from the packet. Intermediate node D may determine that an out-of-order packet condition may be present on the tunnel. For example, intermediate node D may examine the sequence number, obtained from OAM2 removed from the packet, and may compare the sequence number with sequence numbers obtained from OAM fields removed from other packets traversing the tunnel. Intermediate node D may determine, in a manner similar to that described above (at block 625-YES of FIG. 6), that out-of-order packets may be traversing the tunnel. If intermediate node D determines that the number of out-of-order packets, received from intermediate node C, exceeds a predetermined threshold with respect to the tunnel, as set by the network administrator, then intermediate node D may send a notification message to the network administrator and/or other nodes (e.g., ingress node A and/or intermediate nodes B and/or C) on the LSP indicating that conditions, such as out-of-order packets, have been detected on the tunnel and that a rerouting operation should be performed.

Intermediate node D may transmit the packet. For example, the popping operation to remove the intermediate node D label (e.g., LD) and the removal of the other OAM field (e.g., OAM2), as discussed above, may expose the MPLS destination label corresponding to LSP egress node E (e.g., LE), resulting in the packet as follows: the payload and/or data portion of the packet (e.g., packet 1), the updated OAM field (e.g., OAM1"), and the MPLS destination label (e.g., "LE"). Intermediate node D may transmit the packet, as shown as (4) in FIG. 7, to egress node E.

Egress node E may receive the packet and may process the packet. For example, egress node E may receive the packet and may remove (e.g., pop) the MPLS destination label (e.g., LE). Egress node E may detect the presence of the updated OAM field (e.g., OAM1") appended to the packet. Egress node E may remove the updated OAM field from the packet and may examine the OAM information obtained from OAM field removed from the packet.

Egress node E may determine whether conditions are present on the LSP, such as jitter, packet delay, mis-routed, and/or out-of-order packets. For example, in a manner similar to that discussed above (at block 625-YES of FIG. 6), egress node E may determine whether jitter and/or delayed packet conditions are present in the LSP by computing the transit time of the packet over the LSP. Egress node E may compute the transit time for the packet by subtracting the sent timestamp, obtained from the updated OAM field (e.g., OAM1"), from the time that egress node E received the packet (e.g., based on a clock associated with egress node E). Egress node E may detect the presence of packet delay on the LSP if the transit time computed for the packet exceeds a transit time threshold set by the network administrator for the LSP. Moreover, in a manner similar to that discussed above (at block 615 of FIG. 6) egress node E may send an OAM notification to other nodes on the LSP to perform a rerouting operation if egress node E determines that the quantity of packets experiencing delay exceeds a particular threshold set by the network administrator.

In another example, egress node E may identify a particular location on the LSP that may be responsible for jitter and/or packet delay detected on the LSP as discussed above. For example, egress node E may identify the link between ingress node A and intermediate node B as being responsible for the delay on the LSP. In this example, using the timestamp information obtained from the updated OAM field (e.g., OAM1"), removed from the packet, egress node E may subtract the sent timestamp associated with ingress node A, from the timestamp associated with intermediate node B and may determine that the delay on the LSP is attributable to the link between ingress node A and intermediate node B. Egress node E may send an OAM notification message to other nodes (e.g., ingress node A and/or intermediate nodes B, C and/or D) on the LSP indicating that conditions, such as packet delay, have been detected on the link between ingress node A and intermediate node B and that a rerouting operation should be performed.

In another example, egress node E may compute flow quality information from the lost packet information and/or error information obtained over a particular time period (e.g., $T_P$) and/or a particular number of time periods. If egress node E determines that the flow quality is less than a particular flow quality threshold associated with the LSP, then egress node E may then send an OAM notification to other nodes (e.g., ingress node A and/or intermediate nodes B, C and/or D) indicating that conditions, such as poor flow quality, have been detected on the LSP and that a rerouting operation should be performed.

Conclusion

Implementations described herein may provide systems and/or methods for OAM notification using OAM fields appended to packets traversing a network, which may avoid using overhead bandwidth, and/or other network resources, to transmit separate and distinct OAM packets over the network. In an exemplary implementation, an ingress node may generate OAM fields, that include timestamp and/or sequence information, and may append the OAM fields to packets in accordance with OAM insertion rules corresponding to a particular network path. The packets, with the appended OAM fields, may be transmitted to an egress node via the particular network path. The egress node may receive the packets, may detect the presence of appended OAM fields, and may remove the OAM fields from the packets to examine the OAM information (e.g., sequence and/or timestamp information) obtained from the removed OAM fields. From the OAM information, the egress node may determine the presence of particular conditions within the particular network path, such as dropped packets (e.g., if missing sequence numbers are detected that exceed a particular threshold), jitter and/or packet delay (e.g., if transit times of packets, computed from timestamp information, exceed a transit time threshold), mis-routed packets (e.g., if the egress node detects packets with egress identifier information that does not match the address of the egress node) and/or out-of-order packets (e.g., if out-of-order sequence numbers are detected that exceed another threshold). If the particular network conditions are detected, OAM notifications may be sent and/or automatic rerouting operations may be performed to determine alternative network paths on which network traffic may be sent to the egress node.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 5 and 6, the order of the blocks may be modified in other embodiments. Further, non-dependent blocks may be performed in parallel. For example, blocks of FIGS. 5 and 6 may be performed in a piplelined manner with multiple instances of the pipeline operating at any given point in time. In other words, the ingress or egress node may be performing a particular operation on a packet or a set of packets while performing another operation on another packet or another set of packets.

Also, particular operations have been described as being performed by the ingress node (e.g., with regard to FIG. 5) and other particular operations have been described as being performed by the egress node (e.g., with regard to FIG. 6). In another implementation, one or more of the operations of FIGS. 5 and 6 may be combined. For example, the ingress node may detect certain network conditions while the egress node may detect certain other network conditions. In yet another implementation, some or all of the processing, described with regard to FIGS. 5 and 6, may be performed by controller 310, I/O units 315, and/or other components of a node 210.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Although appending an OAM field to a packet is discussed herein as being appended to the packet header, it should be understood that OAM fields may be appended to packets in a different way. For example, OAM fields could be appended to a packet payload, a packet label, and/or a packet trailer. Furthermore, OAM fields could be appended to a fragment or segment of a packet header, a packet label, a packet payload, or a packet trailer.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by an egress node and from an ingress node, a particular packet via a network path;
   detecting, by the egress node, a presence of an operations, administration, and management (OAM) field in a header of the particular packet,
      the header including the OAM field and one or more other fields,
      the particular packet being of a first type, and
      the first type being different from a second type of a stand-alone OAM packet;
   removing, by the egress node, the OAM field from the header of the particular packet based on detecting the presence of the OAM field in the header of the particular packet;
   obtaining, by the egress node, OAM information from the removed OAM field,
      the one or more other fields including other information that is different from the OAM information;
   analyzing, by the egress node, the OAM information to determine that a network condition exists on the network path; and
   notifying, by the egress node, the ingress node that the network condition exists to permit the ingress node to perform a rerouting operation.

2. The method of claim 1,
   where the OAM information includes timestamp information corresponding to a time when the ingress node transmitted the particular packet to the egress node via the network path,
   where analyzing the OAM information includes:
      computing a plurality of transit times for the particular packet and one or more other packets to traverse the network path,
         the plurality of transit times being based on the timestamp information and a plurality of times that correspond to when the particular packet and the one or more other packets were received by the egress node;
      determining that two or more delayed packets, of the particular packet and the one or more other packets, were received by the egress node when two or more of the plurality of transit times exceed a first threshold; and
      determining that a delayed packet condition exists on the network path when a quantity of the two or more delayed packets exceeds a second threshold, and
   where the network condition includes the delayed packet condition.

3. The method of claim 1,
   where the OAM information includes sequence information corresponding to an order that the ingress node transmitted the particular packet, in a flow of a plurality of packets, to the egress node via the network path,
   where analyzing the OAM information includes:
      detecting, based on the sequence information, two or more dropped packets, of the plurality of packets that were not received by the egress node; and
      determining that a dropped packet condition exists on the network path when a quantity of the two or more dropped packets exceeds a threshold, and where the network condition includes the dropped packet condition.

4. The method of claim 1,
   where the OAM information includes information corresponding to the egress node,
   where analyzing the OAM information includes:
      detecting two or more mis-routed packets, of the particular packet and one or more other packets, when the information corresponding to the egress node does not match an address of the egress node;
      computing flow quality information, regarding the network path, based on the two or more mis-routed packets; and
      storing the flow quality information, regarding the network path, in an egress OAM field, and
   where notifying the ingress node includes:
      appending the egress OAM field to a return packet, and transmitting the return packet to the ingress node.

5. The method of claim 1,
   where the OAM information includes sequence information corresponding to an order that the ingress node transmitted the particular packet, in a flow of a plurality of packets, to the egress node via the network path,
   where analyzing the OAM information includes:
      detecting, based on the sequence information, two or more out-of-order packets, of the plurality of packets, that were received out-of-order by the egress node; and
      determining that an out-of-order packet condition exists on the network path when a quantity of the two or more out-of-order packets exceeds a threshold, and
   where the network condition includes the out-of-order packet condition.

6. The method of claim 1, where notifying the ingress node includes:
   storing, in an egress OAM field, at least one of:
      the OAM information,
      information regarding a quantity of mis-routed packets of a plurality of packets that include the particular packet,
      information corresponding to a quantity of dropped packets of the plurality of packets, and
      timestamp information corresponding to a time when the particular packet was received by the egress node;
   appending the egress OAM field to a return packet; and
   transmitting the return packet to the ingress node.

7. A system comprising:
an egress node, connected to an ingress node via a first network path, to:
  receive a particular packet, of a plurality of packets, from the ingress node via the network path;
  detect a presence of an operations, administration, and management (OAM) field in a header of the particular packet,
    the header including the OAM field and one or more other fields,
    the particular packet being of a first type, and
    the first type being different from a second type of a stand-alone OAM packet;
  remove the OAM field from the header of the particular packet based on detecting the presence of the OAM field in the header of the particular packet;
  read OAM information from the removed OAM field,
    the OAM information including sequence information, and
    the one or more other fields including other information that is different from the OAM information;
  identify one or more dropped packets, of the plurality of packets, when the sequence information indicates that the one or more dropped packets have not been received by the egress node;
  determine that a network condition exists on the network path when a quantity of the one or more dropped packets exceeds a threshold; and
  send an OAM notification to the ingress node to identify a second network path to the egress node based the network condition,
    the second network path being different from the first network path.

8. The system of claim 7,
where the OAM information further includes timestamp information; and
where the egress node is further to:
  record a plurality of times corresponding to times that one or more received packets, of the plurality of packets, were received by the egress node,
    the one or more received packets including the particular packet;
  compute a plurality of transit times, for the one or more received packets to traverse the first network path, based on the timestamp information and the plurality of receive times;
  detect one or more delayed packets of the one or more received packets when at least one of the plurality of transit times exceeds a first threshold;
  determine that a different network condition is present on the network path when a quantity of the one or more delayed packets exceeds a second threshold; and
  send a different OAM notification to the ingress node to identify the second network path or a third network path to the egress node based on the different network condition.

9. The system of claim 7, where the egress node is further to:
  identify, based on the sequence information, one or more out-of-order packets, of the plurality of packets, that were received out-of-order;
  determine that a different network condition exists on the network path when a quantity of the one or more out-of-order packets exceeds another threshold; and
  send a different OAM notification to the ingress node to identify the second network path or a third network path to the egress node based on the different network condition.

10. The system of claim 7,
where the OAM information includes information associated with the egress node, and
where the egress node is further to:
  detect at least one mis-routed packet, of the plurality of packets, within a particular time period, when the information associated with the egress node does not match an address of the egress node;
  identify at least one out-of-order packet, of the plurality of packets, within the particular time period;
  compute a flow quality for the first network path, within the particular time period, based on the at least one mis-routed packet and the at least one out-of-order packet;
  determine that another network condition exists on the network path when the flow quality, within the particular time period, is below another threshold; and
  send a different OAM notification to the ingress node to identify the second network path or a third network path to the egress node based on the other network condition.

11. The system of claim 7, where, when sending the OAM notification to the ingress node, the egress node is to:
  create egress OAM information based on the network condition;
  append the egress OAM information to a return packet; and
  transmit the return packet to the ingress node.

12. A system comprising:
an ingress node to:
  obtain operations, administration, and management (OAM) information,
  generate an OAM field that contains the OAM information,
  append the OAM field to a header of a particular packet,
    the header including one or more other fields that include other information,
    the other information being different from the OAM information,
    the particular packet being of a first type, and
    the first type being different from a second type of a stand-alone OAM packet, and
  output the particular packet via a network path; and
an egress node, connected to the ingress node via the network path, to:
  receive, from the ingress node and via the network path, the particular packet,
  detect a presence of the OAM field appended to the header of the particular packet,
  remove the OAM field from the header of the particular packet based on detecting the presence of the OAM field appended to the header of the particular packet,
  read the OAM information from the removed OAM field,
  process the OAM information to create egress OAM information,
  append the egress OAM information to one or more return packets, and
  output the one or more return packets to the ingress node via another network path,
    the ingress node being further to:
      receive the one or more return packets from the egress node via the other network path, read the egress OAM information from the one or more return packets,
determine whether the egress OAM information indicates that a network condition exists on the network path, and
perform a rerouting operation when the network condition exists on the network path.

13. The system of claim 12, where, when appending the OAM field to the header of the particular packet, the ingress node is to:
retrieve OAM insertion rules from a memory,
select the particular packet, from a plurality of packets, based on the OAM insertion rules, and
append the OAM field to the header of the particular packet after selecting the particular packet.

14. The system of claim 13,
where the OAM insertion rules include an append frequency, and
where, when appending the OAM field to the header of the particular packet, the ingress node is to:
append the OAM field to the header of the particular packet based on the append frequency.

15. The system of claim 12,
where the OAM information includes sent timestamp information that corresponds to a time when the ingress node transmitted the particular packet to the egress node via the network path, and
where, when determining whether the egress OAM information indicates that the network condition exists on the network path, the ingress node is to:
compute a plurality of transit times, for the particular packet and one or more other packets to traverse the network path, based on the sent timestamp information and received timestamp information,
the received timestamp information corresponding to times when the particular packet and the one or more other packets were received by the egress node, identify that one or more delayed packets, of the particular packet and the one or more other packets, were received by the egress node when one or more of the plurality of transit times exceeds a threshold corresponding to the network path,
determine that a delayed packet condition exists on the network path when a quantity of the one or more delayed packets exceeds another threshold, and
perform a rerouting operation to locate one or more alternative network paths to the egress node when the delayed packet condition exists.

16. The system of claim 12,
where the egress OAM information includes sequence information,
the sequence information including a plurality of sequence numbers that correspond to an order that the particular packet and one or more other packets were outputted by the ingress node, and
where, when determining whether the egress OAM information indicates that the network condition exists on the network path, the ingress node is to:
identify one or more dropped packets, of the particular packet and the one or more other packets, when one or more of the plurality of sequence numbers are missing,
determine that a dropped packet condition exists on the network path when a quantity the one or more dropped packets exceeds a threshold, and
perform a rerouting operation to locate one or more alternative network paths to the egress node when the dropped packet condition exists.

17. The system of claim 16, where the ingress node is further to:
identify one or more out-of-order packets, of the particular packet and one or more other packets, when one or more of the plurality of sequence numbers are received out-of-order,
determine that an out-of-order packet condition exists on the network path when a quantity of the one or more out-of-order packets exceeds another threshold, and
perform a rerouting operation to locate one or more alternative network paths to the egress node when the out-of-order packet condition exists.

18. The system of claim 16,
where the OAM information includes information associated with the egress node; and
where, the ingress node is further to:
identify one or more mis-routed packets, of the particular packet and the one or more other packets, when the information associated with the egress node does not match an address corresponding to the egress node,
compute flow quality information for the network path based on the one or more dropped packets and the one or more mis-routed packets, and
perform a rerouting operation to locate one or more alternative network paths to the egress node when the flow quality information is below a particular threshold.

19. A method comprising:
retrieving, by an ingress node, operations, administration, and management (OAM) insertion rules from a memory;
selecting, by the ingress node, one or more packets, of a plurality of packets, based on the OAM insertion rules;
appending, by the ingress node, OAM information to the one or more packets,
a first type of the one or more packets being different from a second type of a stand-alone OAM packet;
outputting, by the ingress node, the one or more packets to an egress node via a network path;
receiving, by the ingress node, a return packet from the egress node;
determining, by the ingress node, a presence of an OAM field appended to a header of the return packet,
the header including the OAM field and one or more other fields;
removing, by the ingress node, the OAM field from the header of the return packet based on determining the presence of the OAM field appended to the header of the return packet;
reading, by the ingress node, egress OAM information from the removed OAM field,
the one or more other fields including other information that is different from the egress OAM information;
determining, by the ingress node, whether the egress OAM information indicates that a network condition exists on the network path; and
identifying, by the ingress node, another network path to the egress node when the network condition exists on the network path.

20. The method of claim 19,
where the OAM insertion rules include an append frequency, and
where appending the OAM information includes:
  appending the OAM information to the one or more packets based on the append frequency.

21. The method of claim 19,
where the egress OAM information includes sequence information,
where the sequence information includes a plurality of sequence numbers that correspond to an order that the one or more packets that were outputted by the ingress node,
where determining whether the egress OAM information indicates that the network condition exists on the network path includes:
  identifying one or more dropped packets of the one or more packets when one or more of the plurality of sequence numbers are missing, and
  determining that a dropped packet condition exists on the network path when a quantity of the one or more dropped packets exceeds a threshold, and where the network condition includes the dropped packet condition.

22. The method of claim 21, further comprising:
identifying one or more out-of-order packets of the one or more packets when one or more of the plurality of sequence numbers are received out-of-order;
determining that an out-of-order packet condition exists on the network path when a quantity of the one or more out-of-order packets exceeds another threshold; and
performing a rerouting operation to locate one or more alternative network paths to the egress node when the out-of-order packet condition exists.

23. The method of claim 21,
where the egress OAM information further includes information associated with flow quality over the network path,
where the information associated with the flow quality is based on the quantity of the one or more dropped packets,
where determining whether the egress OAM information indicates that the network condition exists on the network path includes:
  determining that a flow quality condition exists on the network path when the flow quality information is below a particular flow quality threshold, and where the network condition includes the flow quality condition.

24. A system comprising:
an ingress node connected to a plurality of egress nodes, via a plurality of network paths, the ingress node being to:
  retrieve operations, administration, and management (OAM) insertion rules,
  select one or more multicast packets, of a plurality of packets, based on the OAM insertion rules,
  append OAM information to the one or more multicast packets,
    a first type of the one or more multicast packets being different from a second type of a stand-alone OAM packet,
  output, after appending the OAM information, each multicast packet of the one or more multicast packets to two or more egress nodes, of the plurality of egress nodes via two or more network paths of the plurality of network paths,
  receive a return packet from a particular egress node of the two or more egress nodes,
  determine a presence of an OAM field appended to a header of the return packet
    the header including the OAM field and one or more other fields,
  remove the OAM field from the header of the return packet based on determining the presence of the OAM field appended to the header of the return packet,
  read the egress OAM information from the removed OAM field,
  determine whether the egress OAM information indicates that a network condition exists on a particular network path, of the two or more network paths, that connects the ingress node to the particular egress node, and
  identify another network path, of the plurality of network paths, to the particular egress node when the network condition exists on the particular network path.

25. The system of claim 24,
where the egress OAM information includes sequence information,
where the sequence information includes a plurality of sequence numbers that correspond to an order that the one or more multicast packets were outputted by the ingress node,
where, when determining whether the egress OAM information indicates that the network condition exists on the particular network path, the ingress node is to:
  identify one or more dropped packets of the one or more multicast packets when one or more of the plurality of sequence numbers are missing, and
  determine that a dropped packet condition exists on the particular network path when a quantity of the one or more dropped packets exceeds a threshold, and where the network condition includes the dropped packet condition exists.

26. The system of claim 25, where the ingress node is further to:
  identify one or more out-of-order packets of the one or more multicast packets when one or more of the plurality of sequence numbers are out-of-order,
  determine that an out-of-order packet condition exists on the particular network path when a quantity of the one or more out-of-order packets exceeds another threshold, and
  perform another rerouting operation to locate one or more alternative network paths to the particular egress node when the out-of-order packet condition exists.

27. The system of claim 25,
where the egress OAM information further includes information associated with flow quality over the particular network path,
where the information associated with the flow quality is based on the quantity of the one or more dropped packets, and
where, when determining whether the egress OAM information indicates that the network condition exists on the particular network path, the ingress node is to:
  determine that a flow quality condition exists on the particular network path when the flow quality information is below a particular flow quality threshold, and where the network condition includes the flow quality condition exists.

28. The method of claim 1, further comprising:
process the removed OAM field,
append the removed OAM field to another packet, and transmit the other packet to the ingress node via another network path.

* * * * *